United States Patent
Kasada

(10) Patent No.: US 12,374,368 B2
(45) Date of Patent: Jul. 29, 2025

(54) MAGNETIC TAPE APPARATUS, MAGNETIC TAPE, AND MAGNETIC TAPE CARTRIDGE

(71) Applicant: FUJIFILM Corporation, Tokyo (JP)

(72) Inventor: Norihito Kasada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 240 days.

(21) Appl. No.: 18/330,717

(22) Filed: Jun. 7, 2023

(65) Prior Publication Data
US 2024/0013807 A1    Jan. 11, 2024

Related U.S. Application Data

(63) Continuation of application No. PCT/JP2021/045966, filed on Dec. 14, 2021.

(30) Foreign Application Priority Data

Dec. 23, 2020 (JP) .................. 2020-214225

(51) Int. Cl.
*G11B 23/107* (2006.01)
*B65H 23/04* (2006.01)
(Continued)

(52) U.S. Cl.
CPC .......... *G11B 23/107* (2013.01); *B65H 23/04* (2013.01); *B65H 23/105* (2013.01);
(Continued)

(58) Field of Classification Search
CPC ..... G11B 23/04; G11B 23/044; G11B 23/047; G11B 23/08; G11B 23/087;
(Continued)

(56) References Cited

U.S. PATENT DOCUMENTS 4,018,947 A * 4/1977 Stone, Jr. ............... G11B 15/60
360/134
4,209,144 A * 6/1980 Majicek ................. G11B 15/26
(Continued)

FOREIGN PATENT DOCUMENTS

JP    2000-40218 A     2/2000
JP    2004-355694 A    12/2004
(Continued)

OTHER PUBLICATIONS

International Preliminary Report on Patentability dated Jun. 13, 2023 in International Application No. PCT/JP2021/045966.
(Continued)

*Primary Examiner* — Sang K Kim
*Assistant Examiner* — Raveen J Dias
(74) *Attorney, Agent, or Firm* — Sughrue Mion, PLLC

(57) ABSTRACT

Provided is a magnetic tape apparatus in which the magnetic tape is run between a winding reel and a cartridge reel in a state where a tension is applied in a longitudinal direction, a maximum value of the tension is 0.50 N or more, the magnetic tape after being run in a state where the tension is applied is wound around the cartridge reel with a tension of 0.30 N or less applied in the longitudinal direction, and the number of recesses existing on a surface of the magnetic layer of the magnetic tape and having an equivalent circle diameter of 0.10 μm or more and less than 0.20 μm is 100 or more and 2000 or less per an area of 40 μm×40 μm.

19 Claims, 2 Drawing Sheets

(51) Int. Cl.
*B65H 23/10* (2006.01)
*B65H 23/18* (2006.01)
*G11B 5/70* (2006.01)
*G11B 5/708* (2006.01)
*G11B 5/73* (2006.01)
*G11B 5/735* (2006.01)
*G11B 5/78* (2006.01)
*G11B 15/43* (2006.01)
*G11B 23/027* (2006.01)
*G11B 23/04* (2006.01)

(52) U.S. Cl.
CPC .......... *B65H 23/1806* (2013.01); *G11B 5/70* (2013.01); *G11B 5/708* (2013.01); *G11B 5/73* (2013.01); *G11B 5/735* (2013.01); *G11B 5/78* (2013.01); *G11B 15/43* (2013.01); *G11B 23/027* (2013.01); *G11B 23/04* (2013.01)

(58) Field of Classification Search
CPC ........ G11B 23/08728; G11B 23/08757; G11B 23/107; G11B 23/08778; G11B 15/43; G11B 5/66; G11B 5/70; G11B 5/708; G11B 5/73; G11B 5/735; G11B 5/78; B65H 23/04; B65H 23/048; B65H 23/06; B65H 23/063; B65H 23/08; B65H 23/085; B65H 23/10; B65H 23/105; B65H 23/12; B65H 23/14; B65H 23/18; B65H 23/1806; B65H 23/188; B65H 23/1882; B65H 23/1888; B65H 23/195; B65H 23/1955; B65H 2701/1714; B65H 2701/1724
See application file for complete search history.

(56) References Cited

U.S. PATENT DOCUMENTS

| | | | | | |
|---|---|---|---|---|---|
| 4,736,900 | A | * | 4/1988 | Okamura | G11B 15/43 360/91 |
| 5,362,009 | A | * | 11/1994 | Howard, Jr. | G11B 23/08778 |
| 5,447,279 | A | * | 9/1995 | Janssen | G11B 23/08757 242/615.12 |
| 5,620,150 | A | * | 4/1997 | Min | G11B 15/43 360/71 |
| 5,947,410 | A | * | 9/1999 | Christie | B65H 23/16 |
| 6,068,206 | A | * | 5/2000 | Lindsay, Jr. | G03B 1/58 360/71 |
| 7,446,975 | B2 | * | 11/2008 | Komai | G11B 5/584 |
| 10,720,181 | B1 | * | 7/2020 | Yamaga | G11B 5/78 |
| 10,978,104 | B2 | * | 4/2021 | Yamaga | G11B 5/59633 |
| 11,295,763 | B2 | * | 4/2022 | Kasada | G11B 5/62 |
| 11,521,650 | B2 | * | 12/2022 | Yamaga | G11B 5/78 |
| 11,651,792 | B2 | * | 5/2023 | Kasada | G11B 5/00813 360/71 |
| 11,972,784 | B2 | * | 4/2024 | Kasada | G11B 5/70678 |
| 2004/0149846 | A1 | * | 8/2004 | Zwettler | G11B 15/43 242/334.5 |
| 2005/0122615 | A1 | * | 6/2005 | Horimai | G11B 5/00813 |
| 2005/0201017 | A1 | * | 9/2005 | Koga | G11B 5/584 360/291 |
| 2008/0297950 | A1 | * | 12/2008 | Noguchi | G11B 5/71 |
| 2009/0027812 | A1 | * | 1/2009 | Noguchi | G11B 5/70 360/324.11 |
| 2010/0081011 | A1 | * | 4/2010 | Nakamura | G11B 5/7356 428/832 |
| 2014/0063643 | A1 | * | 3/2014 | Bui | G11B 15/46 |
| 2016/0322076 | A1 | * | 11/2016 | Mori | G11B 5/7356 |
| 2018/0229764 | A1 | | 8/2018 | Sugawara et al. | |
| 2018/0358046 | A1 | * | 12/2018 | Shirata | G11B 5/7085 |
| 2020/0312360 | A1 | * | 10/2020 | Imaoka | G11B 5/712 |
| 2021/0125637 | A1 | * | 4/2021 | Biskeborn | G11B 23/18 |
| 2021/0241793 | A1 | * | 8/2021 | Anno | G11B 23/027 |
| 2021/0249044 | A1 | | 8/2021 | Nakashio et al. | |
| 2021/0343311 | A1 | * | 11/2021 | Brown | G11B 5/56 |
| 2021/0375307 | A1 | * | 12/2021 | Kasada | G11B 5/62 |
| 2021/0383830 | A1 | * | 12/2021 | Kasada | G11B 5/736 |
| 2022/0199117 | A1 | * | 6/2022 | Kasada | G11B 5/00813 |
| 2022/0208227 | A1 | | 6/2022 | Yamaga | |
| 2022/0254370 | A1 | * | 8/2022 | Yamaga | G11B 23/027 |
| 2022/0415350 | A1 | * | 12/2022 | Kasada | G11B 15/43 |
| 2024/0119963 | A1 | * | 4/2024 | Kasada | G11B 5/70678 |

FOREIGN PATENT DOCUMENTS

| | | |
|---|---|---|
| JP | 2005-285268 A | 10/2005 |
| JP | 2010-102818 A | 5/2010 |
| JP | 2016-212932 A | 12/2016 |
| JP | 2019-3711 A | 1/2019 |
| JP | 6590102 B1 | 10/2019 |
| JP | 6635219 B1 | 1/2020 |
| JP | 2020-77453 A | 5/2020 |
| JP | 2020-166910 A | 10/2020 |
| JP | 2020-177724 A | 10/2020 |

OTHER PUBLICATIONS

Written Opinion dated Mar. 8, 2022 in International Application No. PCT/JP2021/045966.
International Search Report dated Mar. 8, 2022 in International Application No. PCT/JP2021/045966.
Office Action dated Mar. 19, 2024 in Japanese Application No. 2020-214225.
Office Action dated Jul. 2, 2024 in Japanese Application No. 2020-214225.

* cited by examiner

MAGNETIC TAPE APPARATUS, MAGNETIC TAPE, AND MAGNETIC TAPE CARTRIDGE

CROSS-REFERENCE TO RELATED APPLICATIONS

This application is a Continuation of PCT International Application No. PCT/JP2021/045966 filed on Dec. 14, 2021, which claims priority under 35 U.S.C. § 119(a) to Japanese Patent Application No. 2020-214225 filed on Dec. 23, 2020. Each of the above applications is hereby expressly incorporated by reference, in its entirety, into the present application.

BACKGROUND OF THE INVENTION

1. Field of the Invention

The present invention relates to a magnetic tape apparatus, a magnetic tape, and a magnetic tape cartridge.

2. Description of the Related Art

There are two types of magnetic recording media: a tape shape and a disk shape, and a tape-shaped magnetic recording medium, that is, a magnetic tape is mainly used for data storage applications such as data backup and archiving (for example, see JP6590102B)

SUMMARY OF THE INVENTION

Recording of data on a magnetic tape is usually performed by running the magnetic tape in a magnetic tape apparatus (usually called a "drive") and recording the data on a data band by making a magnetic head follow the data band of the magnetic tape. Thereby, a data track is formed in the data band. In addition, in a case where the recorded data is reproduced, the data recorded on the data band is read by running the magnetic tape in the magnetic tape apparatus and by making the magnetic head follow the data band of the magnetic tape. After such recording or reproduction, the magnetic tape is stored in a state of being wound around a reel (hereinafter, referred to as a "cartridge reel") in a magnetic tape cartridge until the next recording and/or reproduction is performed.

After the storage, in a case where the recording and/or reproduction is performed, in a case where the magnetic head for recording and/or reproducing data records and/or reproduces data while being deviated from a target track position due to deformation of the magnetic tape, a phenomenon such as overwriting of recorded data or reproduction failure may occur. On the other hand, in recent years, in the field of data storage, there is an increasing need for long-term storage of data, which is called archive. However, in general, as a storage period increases, the magnetic tape tends to be easily deformed. Therefore, it is expected that further efforts will be made to suppress the occurrence of the above-described phenomenon after the storage.

Further, in a case where a running state of the magnetic tape is unstable in a case where the magnetic tape is accommodated in the magnetic tape cartridge to store the magnetic tape, for example, an edge of the magnetic tape may abut on a flange usually provided on the cartridge reel, causing a damage to the edge.

In view of the above, an object of one aspect of the present invention is to provide means for enabling stable running of a magnetic tape in a case where the magnetic tape is accommodated in a magnetic tape cartridge and for enabling favorable recording and/or reproducing in recording and/or reproducing data on the magnetic tape after storage.

One aspect of the present invention relates to a magnetic tape apparatus comprising: a winding reel; a magnetic tape; and a magnetic tape cartridge having a cartridge reel, in which, in the magnetic tape apparatus, the magnetic tape is run between the winding reel and the cartridge reel in a state where a tension is applied in a longitudinal direction of the magnetic tape, and a maximum value of the tension is 0.50 N or more, the magnetic tape after being run in a state where the tension is applied is wound around the cartridge reel with a tension of 0.30 N or less applied in the longitudinal direction of the magnetic tape, the magnetic tape includes a non-magnetic support, and a magnetic layer containing a ferromagnetic powder, and the number of recesses existing on a surface of the magnetic layer and having an equivalent circle diameter of 0.10 μm or more and less than 0.20 μm is 100 or more and 2000 or less per an area of 40 μm×40 μm.

In addition, another aspect of the present invention relates to a magnetic tape that is used in a magnetic tape apparatus in which the magnetic tape is run between a winding reel and a cartridge reel of a magnetic tape cartridge in a state where a tension is applied in a longitudinal direction of the magnetic tape, a maximum value of the tension is 0.50 N or more, and the magnetic tape after being run in a state where the tension is applied is wound around the cartridge reel with a tension of 0.30 N or less applied in the longitudinal direction of the magnetic tape, the magnetic tape comprising: a non-magnetic support; and a magnetic layer containing a ferromagnetic powder, in which the number of recesses existing on a surface of the magnetic layer and having an equivalent circle diameter of 0.10 μm or more and less than 0.20 μm is 100 or more and 2000 or less per an area of 40 μm×40 μm.

In one embodiment, the tension applied in the longitudinal direction of the magnetic tape may be changed during the running.

In one embodiment, a tape thickness of the magnetic tape may be 5.2 μm or less.

In one embodiment, the magnetic tape may further comprise a non-magnetic layer containing a non-magnetic powder between the non-magnetic support and the magnetic layer.

In one embodiment, the magnetic tape may further comprise a back coating layer containing a non-magnetic powder on a surface side of the non-magnetic support opposite to a surface side having the magnetic layer.

In one embodiment, the non-magnetic powder of the back coating layer may include carbon black.

In one embodiment, a vertical squareness ratio of the magnetic tape may be 0.60 or more.

Still another aspect of the present invention relates to a magnetic tape cartridge in which the above-described magnetic tape is accommodated by being wound around a cartridge reel.

According to one aspect of the present invention, it is possible to enable stable running of a magnetic tape in a case where the magnetic tape is accommodated in a magnetic tape cartridge and to enable favorable recording and/or reproducing in recording and/or reproducing data on the magnetic tape after storage.

DESCRIPTION OF THE PREFERRED EMBODIMENTS

Figure 1:
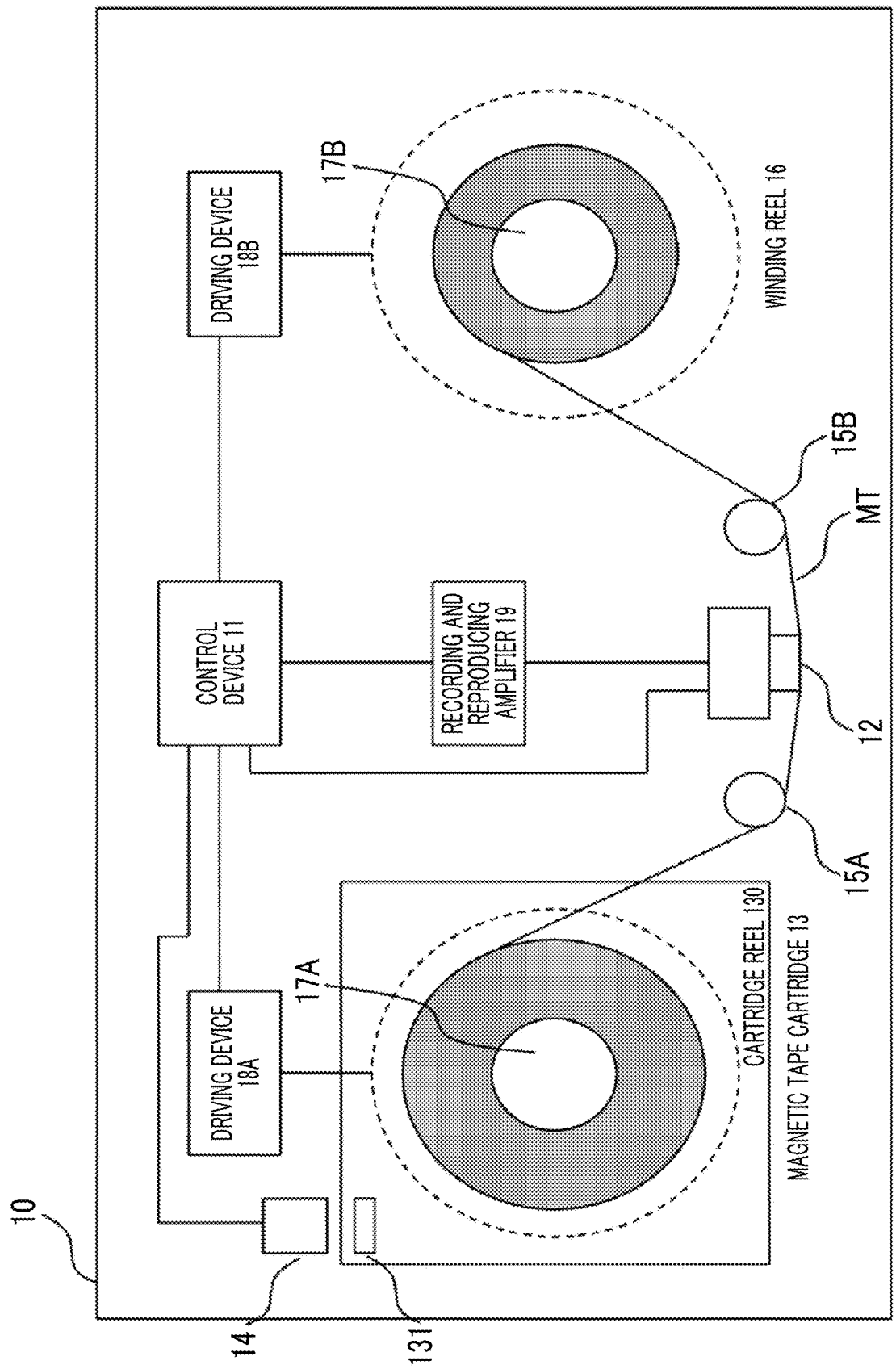
FIG. 1 is a schematic view showing an example of a magnetic tape apparatus.

Hereinafter, the magnetic tape apparatus and the magnetic tape will be described in more detail. Hereinafter, an aspect of the magnetic tape apparatus and the magnetic tape may be described with reference to the drawings. Note that the magnetic tape apparatus and the magnetic tape are not limited to the aspects shown in the drawings.

[Configuration of Magnetic Tape Apparatus]

A magnetic tape apparatus 10 shown in FIG. 1 controls a recording and reproducing head unit 12 in accordance with an instruction from a control device 11, and records and reproduces data on a magnetic tape MT.

The magnetic tape apparatus 10 has a configuration capable of detecting and adjusting a tension applied in a longitudinal direction of the magnetic tape from spindle motors 17A and 17B for controlling rotation of a cartridge reel 130 and a winding reel 16 and driving devices 18A and 18B thereof.

The magnetic tape apparatus 10 has a configuration in which a magnetic tape cartridge 13 can be mounted.

The magnetic tape apparatus 10 has a cartridge memory reading and writing device 14 capable of reading and writing a cartridge memory 131 in the magnetic tape cartridge 13.

From the magnetic tape cartridge 13 mounted on the magnetic tape apparatus 10, an end portion or a leader pin of the magnetic tape MT is pulled out by an automatic loading mechanism or a manual operation, and the magnetic layer surface of the magnetic tape MT passes on the recording and reproducing head through guide rollers 15A and 15B in a direction contacting with a recording and reproducing head surface of the recording and reproducing head unit 12, and thus the magnetic tape MT is wound around a winding reel 16.

The rotation and torque of the spindle motor 17A and the spindle motor 17B are controlled by a signal from the control device 11, and the magnetic tape MT is run at any speed and tension. A servo pattern previously formed on the magnetic tape can be used to control the tape speed. In order to detect the tension, a tension detecting mechanism may be provided between the magnetic tape cartridge 13 and the winding reel 16. The tension may be adjusted by using the guide rollers 15A and 15B in addition to the control by the spindle motors 17A and 17B.

The cartridge memory reading and writing device 14 is configured to be capable of reading out and writing information in the cartridge memory 131 in response to an instruction from the control device 11. As a communication method between the cartridge memory reading and writing device 14 and the cartridge memory 131, for example, an international organization for standardization (ISO) 14443 method can be employed.

The control device 11 includes, for example, a controller, a storage unit, a communication unit, and the like.

The recording and reproducing head unit 12 includes, for example, a recording and reproducing head, a servo tracking actuator that adjusts a position of the recording and reproducing head in the track width direction, a recording and reproducing amplifier 19, a connector cable for connection with the control device 11, and the like. The recording and reproducing head includes, for example, a recording element for recording data on the magnetic tape, a reproducing element for reproducing data on the magnetic tape, and a servo signal reading element for reading a servo signal recorded on the magnetic tape. For example, one or more recording elements, reproducing elements, and servo signal reading elements are mounted in one magnetic head. Alternatively, each element may be separately provided in a plurality of magnetic heads according to the running direction of the magnetic tape.

The recording and reproducing head unit 12 is configured to be capable of recording data on the magnetic tape MT in response to an instruction from the control device 11. In addition, the recording and reproducing head unit 12 is configured to be capable of reproducing the data recorded on the magnetic tape MT is configured to be able to be reproduced in response to an instruction from the control device 11.

The control device 11 has a mechanism for obtaining the running position of the magnetic tape from the servo signal read from the servo band in a case where the magnetic tape MT is run, and controlling the servo tracking actuator such that the recording element and/or the reproducing element is located at a target running position (track position). The track position is controlled by feedback control, for example.

The control device 11 has a mechanism for obtaining a servo band interval from servo signals read from two adjacent servo bands in a case where the magnetic tape MT is run. In addition, the control device 11 has a mechanism for adjusting and changing the tension applied in the longitudinal direction of the magnetic tape by controlling the torque of the spindle motor 17A and the spindle motor 17B and/or the guide rollers 15A and 15B such that the servo band interval becomes a target value. The tension is adjusted by feedback control, for example. In addition, the control device 11 can store the obtained information on the servo band interval in the storage unit inside the control device 11, the cartridge memory 131, an external connection device, or the like.

In the magnetic tape apparatus, the tension applied in the longitudinal direction of the magnetic tape during recording and/or reproduction is a constant value in one aspect, and changes in another aspect. In the present invention and the present specification, a value of the tension applied in the longitudinal direction of the magnetic tape is a value of the tension to be used by the control device of the magnetic tape apparatus in order to control the mechanism for adjusting the above-described tension as the tension to be applied in the longitudinal direction of the magnetic tape. In addition, the tension actually applied in the longitudinal direction of the magnetic tape in the magnetic tape apparatus can be detected, for example, with a tension detecting mechanism provided between the magnetic tape cartridge 13 and the winding reel 16 in FIG. 1, as described above. Further, for example, it can be controlled by the control device of the magnetic tape apparatus or the like such that the minimum tension does not fall below a value determined or recommended by the standard or the like and/or the maximum value does not exceed a value determined or recommended by the standard or the like.

[Magnetic Tape Cartridge]

In a magnetic tape cartridge before being mounted on the magnetic tape apparatus and after being taken out from the magnetic tape apparatus, the magnetic tape is generally accommodated inside a cartridge body by being wound around a cartridge reel. The cartridge reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. The magnetic tape cartridge included in the magnetic tape apparatus can be a single reel type magnetic tape cartridge in one aspect, and can be a dual reel type magnetic tape cartridge in another aspect. Regarding the dual reel type magnetic tape cartridge, the cartridge reel refers to a reel on a side on which the magnetic tape is mainly wound in a case of being stored after recording and/or reproduction of data, while the other reel is referred to as a winding reel. In a case where the single reel type magnetic tape cartridge is mounted on the magnetic tape apparatus for recording and/or reproducing data on the magnetic tape, the magnetic tape is pulled out of the magnetic tape cartridge to be wound around the winding reel on the magnetic tape apparatus side for example, as shown in FIG. 1. A magnetic head is disposed on a magnetic tape transportation path from the magnetic tape cartridge to the winding reel. The magnetic tape runs by feeding and winding of the magnetic tape between a cartridge reel (also referred to as a "supply reel") on the magnetic tape cartridge side and a winding reel on the magnetic tape apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge.

In one aspect, the magnetic tape cartridge may include a cartridge memory. The cartridge memory can be, for example, a non-volatile memory, in which tension adjustment information is already recorded or the tension adjustment information is recorded. The tension adjustment information is information for adjusting the tension applied in the longitudinal direction of the magnetic tape. Regarding the cartridge memory, the above description can also be referred to.

[Tension During Running and Tension During Winding Around Cartridge Reel]

In the magnetic tape apparatus, the magnetic tape can be run between the cartridge reel (supply reel) and the winding reel to record data on the magnetic tape and/or reproduce recorded data. In the magnetic tape apparatus, a tension is applied in the longitudinal direction of the magnetic tape during such running. The greater the tension applied to the longitudinal direction of the magnetic tape, the greater the contraction of a dimension in a width direction of the magnetic tape (that is, the width can be narrowed), and the smaller the tension, the smaller the degree of the contraction. Therefore, the dimension in the width direction of the magnetic tape can be controlled by a value of the tension applied in the longitudinal direction of the magnetic tape running in the magnetic tape apparatus. In the magnetic tape apparatus, the magnetic tape runs in a state where a tension of 0.50 N or more is applied at the maximum in the longitudinal direction. In a case where the magnetic tape is stored as it is in the magnetic tape cartridge after running in a state where such a large tension is applied, it is considered that the magnetic tape is likely to be deformed during the storage. For example, during the storage, in the magnetic tape accommodated in the magnetic tape cartridge, it is supposed that different types of deformation are likely to occur depending on a position such that a portion close to the cartridge reel is deformed to be wider than an initial stage because of compressive stress in a tape thickness direction, and a portion far from the cartridge reel is deformed to be narrower than the initial stage formed because of tensile stress in the tape longitudinal direction, and, in the magnetic tape accommodated in a state where a large tension is applied, it is considered that a significantly large difference in the deformation is likely to occur depending on the position. It is considered that this may cause the magnetic head to deviate from the target track position to record and/or reproduce the data in a case where the recording and/or the reproduction is performed after the storage.

Therefore, in the above-described magnetic tape apparatus, in a case where the magnetic tape is wound around the cartridge reel after running in a state where a tension of 0.50 N or more at the maximum is applied in the longitudinal direction, the tension applied in the longitudinal direction of the magnetic tape is set to 0.30 N or less. This enables the magnetic tape to be wound around the cartridge reel and stored in the magnetic tape cartridge with a tension smaller than the tension applied in the longitudinal direction during running, so that the present inventor considers that the occurrence of the phenomenon that may occur due to the deformation described above can be suppressed.

However, it has been also found in the study of the present inventor that the running state of the magnetic tape tends to be unstable in a case where the magnetic tape is wound around the cartridge reel with a relatively small tension of 0.30 N or less. With respect to this, in the above-described magnetic tape, the number of recesses existing on a surface of the magnetic layer and having an equivalent circle diameter of 0.10 μm or more and less than 0.20 μm is 100 or more and 2000 or less per an area of 40 μm×40 μm. The present inventor supposes that this leads to an improvement in running stability in a case where the magnetic tape is wound around the cartridge reel with a tension of 0.30 N or less.

The maximum value of the tension applied in the longitudinal direction of the running magnetic tape in the magnetic tape apparatus is 0.50 N or more, and may be 0.60 N or more, 0.70 N or more, or 0.80 N or more. Such a maximum value may be, for example, 1.50 N or less, 1.40 N or less, 1.30 N or less, 1.20 N or less, 1.10 N or less, or 1.00 N or less. The tension applied in the longitudinal direction of the magnetic tape during running can be a certain value and can be changed. In a case of a certain value, the tension applied in the longitudinal direction of the magnetic tape can be controlled, for example, by a control device of the magnetic tape apparatus such that a tension of a certain value of 0.50 N or more is applied in the longitudinal direction of the magnetic tape. On the other hand, in a case where the tension applied in the longitudinal direction of the magnetic tape during running is changed, for example, the information on the dimensions in the width direction of the magnetic tape during running is acquired using the servo signal, and the tension applied in the longitudinal direction of the magnetic tape can be adjusted and changed according to the acquired dimension information. Thereby, the dimension in the width direction of the magnetic tape can be controlled. One aspect of such tension adjustment is as described above with reference to FIG. 1. Note that the magnetic tape apparatus is not limited to the exemplified aspects. In the magnetic tape apparatus, the tension applied in the longitudinal direction of the magnetic tape during running is changed, the minimum value thereof may be 0.10 N or more, 0.20 N or more, 0.30 N or more, or 0.40 N or more. In addition, such a minimum value may be, for example, 0.40 N or less or less than 0.40 N in one aspect, and may be 0.60 N or less or 0.50 N or less in another aspect.

In the magnetic tape apparatus, in a case where the magnetic tape is run for recording and/or reproduction of data, the following aspects can be mentioned as specific aspects of the running of the magnetic tape.

Aspect 1: At an end of running for recording and/or reproduction of data, the entire length of the magnetic tape is wound around the winding reel.

Aspect 2: At an end of running for recording and/or reproduction of data, the entire length of the magnetic tape is wound around the cartridge reel.

Aspect 3: At an end of running for recording and/or reproduction of data, a part of the magnetic tape is wound around the cartridge reel and a part of the magnetic tape is wound around the winding reel.

In Aspect 1, the tension applied in the longitudinal direction of the magnetic tape in a case where the entire length of the magnetic tape is wound around the cartridge reel for accommodation in the magnetic tape cartridge is 0.30 N or less.

In Aspect 2, first, the magnetic tape is wound from the cartridge reel to the winding reel. In this case, the tension applied in the longitudinal direction of the magnetic tape is not particularly limited. The tension may be a certain value or may be changed, and it may or may not follow the above-described description regarding the value of the tension during running. This is because in a case where the tension applied in the longitudinal direction of the magnetic tape during subsequent winding around the cartridge reel is 0.30 N or less, favorable recording and/or reproduction can be performed in recording and/or reproduction of data on the magnetic tape after storage. The tension applied in the longitudinal direction of the magnetic tape in winding the entire length of the magnetic tape from the winding reel to the cartridge reel is 0.30 N or less.

Aspect 3 can be one of the following two aspects. In the first aspect (Aspect 3-1), at an end of running for recording and/or reproduction of data, a portion of the magnetic tape wound around the cartridge reel is wound with a tension of 0.30 N or less applied in the longitudinal direction in a case of being wound around the cartridge reel. The second aspect (Aspect 3-2) is an aspect other than Aspect 3-1 of Aspect 3. In order to wind the entire length of the magnetic tape around the cartridge reel and accommodate it in the cartridge, in Aspect 3-1, the tension applied in the longitudinal direction of the magnetic tape in a case where the magnetic tape not wound around the cartridge reel is wound around the cartridge reel is 0.30 N or less. Aspect 3-2 is the same as Aspect 2. That is, first, the magnetic tape is wound from the cartridge reel to the winding reel. The tension applied in the longitudinal direction of the magnetic tape in subsequently winding the entire length of the magnetic tape from the winding reel to the cartridge reel is 0.30 N or less.

In any of Aspect 1, Aspect 2, or Aspect 3 described above, the tension applied in the longitudinal direction of the magnetic tape in a case where the magnetic tape is wound around the cartridge reel may be a certain value of 0.30 N or less, and may be changed in a range of 0.30 N or less. The maximum value of the tension applied in the longitudinal direction of the magnetic tape in a case where the magnetic tape is wound around the cartridge reel is 0.30 N or less, and may be 0.25 N or less or 0.20 N or less. The minimum value of the tension applied in the longitudinal direction of the magnetic tape in a case where the magnetic tape is wound around the cartridge reel may be, for example, 0.10 N or more or 0.20 N or more, or may be less than the values exemplified here. The tension in a case where the magnetic tape is wound around the cartridge reel can be controlled, for example, by a control device of the magnetic tape apparatus. In addition, an operation program may be recorded in the cartridge memory such that winding around the cartridge reel is performed with a rewinding tension set after recording and/or reproduction of data on the magnetic tape over the longitudinal direction of the magnetic tape, and the program may be read out by the control device to execute the winding operation.

[Magnetic Tape]

The magnetic tape apparatus includes a magnetic tape including a non-magnetic support, and a magnetic layer containing a ferromagnetic powder, in which the number of recesses existing on a surface of the magnetic layer and having an equivalent circle diameter of 0.10 µm or more and less than 0.20 µm is 100 or more and 2000 or less per an area of 40 µm×40 µm.

<Existence State of Recess on Magnetic Layer Surface>

In the present invention and the present specification, the number of the recesses existing on the surface of the magnetic layer and having an equivalent circle diameter of 0.10 µm or more and less than 0.20 µm is obtained by performing measurement on the surface of the magnetic layer of a magnetic recording medium by using an atomic force microscope (AFM) as follows. In the present invention and the present specification, the term "magnetic layer surface (surface of the magnetic layer)" has the same meaning as the surface of the magnetic recording medium on the magnetic layer side. The number of the recesses (per an area of 40 µm×40 µm) existing on a surface of the magnetic layer and having an equivalent circle diameter of 0.10 µm or more and less than 0.20 µm, which is obtained as described below, is also referred to as "the number of recesses having an equivalent circle diameter in the above range" or simply referred to as "the number of recesses".

A measurement region is a region of 40 µm square (40 µm×40 µm) randomly selected on the magnetic layer surface. The measurement is performed at three different measurement points on the magnetic layer surface (n=3). An arithmetic average of three measurement results obtained by such measurement is defined as the number of the recesses existing on the surface of the magnetic layer of the magnetic recording medium to be measured and having an equivalent circle diameter of 0.10 µm or more and less than 0.20 µm. In a plane image of the magnetic layer surface obtained using AFM, a plane where a volume of protruding components and a volume of recess components in the measurement region are equal to each other is defined as a reference plane, and a portion detected as a recessed portion from this reference plane is specified as the "recess". Among the portions specified as the recess, there may be a recess of which a part thereof is in the measurement region and the other portion is outside the measurement region. In obtaining the number of the recesses, the number of the recesses including such a recess is measured. In a plane image of the magnetic layer surface obtained by using AFM, an area of a portion specified as a recess (hereinafter, an "area A") is measured, and an equivalent circle diameter L is calculated by $(A/\pi)^{(1/2)} \times 2 = L$. Here, the operator "^" represents a power. The equivalent circle diameter may be obtained in 0.01 µm increments by rounding off the third decimal point and rounding down the fourth decimal point, as a value in units of µm. The following measurement conditions can be used as an example of the AFM measurement conditions.

The region of the area of 40 µm×40 µm on the surface of the magnetic layer of the magnetic recording medium is measured with an AFM (Nanoscope 5 manufactured by BRUKER) in a peak force-tapping mode. SCANASYST- AIR manufactured by BRUKER is used as a probe, a resolution is set to 512 pixels×512 pixels, and a scan speed is set to a speed at which one screen (512 pixels×512 pixels) is measured in 512 seconds.

The number of the recesses existing on the surface of the magnetic layer of the magnetic tape and having an equivalent circle diameter of 0.10 μm or more and less than 0.20 μm is 100 or more and 2000 or less per an area of 40 μm×40 μm. The present inventor supposes that this leads to an improvement in running stability in a case where the magnetic tape is wound around the cartridge reel with a tension of 0.30 N or less. Regarding this point, the present inventor supposes that the presence of the recesses of the above size on the surface of the magnetic layer in the above range makes it possible to wind the magnetic tape more uniformly in winding performed with a tension of 0.30 N or less and/or contributes to stabilizing a contact state between the magnetic tape transport system (for example, a guide) and the magnetic tape, and as a result, to improve the running stability in a case where the magnetic tape is wound around the cartridge reel with a tension of 0.30 N or less. Note that the present invention is not limited to the supposition described in the present specification. From the viewpoint of improving the running stability during winding with a tension of 0.30 N or less, the number of the recesses having an equivalent circle diameter in the above range is 2000 or less, preferably 1500 or less, more preferably 1000 or less, still more preferably 800 or less, still more preferably 500 or less, and still more preferably 300 or less. In addition, from the viewpoint of improving the running stability during winding with a tension of 0.30 N or less, the number of the recesses having an equivalent circle diameter in the above range is 100 or more, preferably 150 or more, and more preferably 200 or more.

An example of a control method for the number of the recesses will be described in detail below.

<Vertical Squareness Ratio>

In one aspect, a vertical squareness ratio of the magnetic tape may be, for example, 0.55 or more, and is preferably 0.60 or more. From the viewpoint of improving the electromagnetic conversion characteristics, it is preferable that the vertical squareness ratio of the magnetic tape is 0.60 or more. In principle, the upper limit of the squareness ratio is 1.00 or less. The vertical squareness ratio of the magnetic tape may be 1.00 or less, 0.95 or less, 0.90 or less, 0.85 or less, or 0.80 or less. From the viewpoint of improving the electromagnetic conversion characteristics, a large value of the vertical squareness ratio of the magnetic tape is preferable. The vertical squareness ratio of the magnetic tape can be controlled by a well-known method such as performing a vertical alignment treatment.

In the present invention and the present specification, the term "vertical squareness ratio" refers to a squareness ratio measured in the vertical direction of the magnetic tape. The term "vertical direction" described regarding the squareness ratio refers to a direction orthogonal to the magnetic layer surface, and can also be referred to as a thickness direction. In the present invention and the present specification, the vertical squareness ratio is obtained by the following method.

A sample piece having a size capable of being introduced into a vibrating sample magnetometer is cut out from the magnetic tape to be measured. For this sample piece, using a vibrating sample magnetometer, a magnetic field is applied in the vertical direction (direction orthogonal to the magnetic layer surface) of the sample piece at a maximum applied magnetic field of 3979 kA/m, a measurement temperature of 296 K, and a magnetic field sweeping speed of 8.3 kA/m/sec, and the magnetization strength of the sample piece with respect to the applied magnetic field is measured. The measured value of the magnetization strength is obtained as a value after demagnetic field correction and as a value obtained by subtracting the magnetization of a sample probe of the vibrating sample magnetometer as a background noise. Assuming that the magnetization strength at the maximum applied magnetic field is Ms and the magnetization intensity at zero applied magnetic field is Mr, a squareness ratio SQ is a value calculated as SQ=Mr/Ms. The measurement temperature refers to a temperature of the sample piece, and, by setting an atmosphere temperature around the sample piece to a measurement temperature, the temperature of the sample piece can be set to a measurement temperature by establishing a temperature equilibrium.

Hereinafter, the magnetic tape will be described in more detail.

<Magnetic Layer>

(Ferromagnetic Powder)

As a ferromagnetic powder included in the magnetic layer, a well-known ferromagnetic powder as a ferromagnetic powder used in magnetic layers of various magnetic recording media can be used alone or in combination of two or more. From the viewpoint of improving recording density, it is preferable to use a ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include a hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on an at % basis among the divalent metal atoms included in the powder. Note that a rare earth atom is not included in the above divalent metal atom. The term "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is one aspect of the hexagonal ferrite powder, will be described in more detail.

An activation volume of the hexagonal strontium ferrite powder is preferably in a range of 800 to 1600 $nm^3$. The finely granulated hexagonal strontium ferrite powder having an activation volume in the above range is suitable for manufacturing a magnetic tape exhibiting excellent electromagnetic conversion characteristics. The activation volume of the hexagonal strontium ferrite powder is preferably 800 $nm^3$ or more, and may be, for example, 850 $nm^3$ or more. Further, from the viewpoint of further improving the electromagnetic conversion characteristics, the activation volume of the hexagonal strontium ferrite powder is more preferably 1500 $nm^3$ or less, still more preferably 1400 $nm^3$ or less, still more preferably 1300 $nm^3$ or less, still more preferably 1200 $nm^3$ or less, and still more preferably 1100 $nm^3$ or less. The same applies to an activation volume of the hexagonal barium ferrite powder.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing a measurement in a coercivity Hc measurement portion at a magnetic field sweep rate of 3 minutes and 30 minutes using a vibrating sample magnetometer (measurement temperature: 23° C. 1° C.). For a unit of the anisotropy constant Ku, 1 erg/cc=$1.0×10^{-1}$ $J/m^3$.

$$Hc=2Ku/Ms\{1-[(kT/KuV)\ln(At/0.693)]^{1/2}\}$$

[In the above expression, Ku: anisotropy constant (unit: $J/m^3$), Ms: saturation magnetization (unit: kA/m), k: Boltzmann constant, T: absolute temperature (unit: K), V: activation volume (unit: $cm^3$), A: spin precession frequency (unit: $s^{-1}$), t: magnetic field reversal time (unit: s)]

An index for reducing thermal fluctuation, in other words, for improving the thermal stability may include the anisotropy constant Ku. The hexagonal strontium ferrite powder preferably has Ku of $1.8×10^5$ $J/m^3$ or more, and more preferably has Ku of $2.0×10^5$ $J/m^3$ or more. Ku of the hexagonal strontium ferrite powder may be, for example, $2.5×10^5$ $J/m^3$ or less. Here, since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content>1.0. A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content>1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, and thus it is possible to increase an anisotropy constant Ku. The higher a value of an anisotropy constant Ku is, the more a phenomenon called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

Moreover, it is supposed that the use of the hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that the hexagonal strontium ferrite powder having a rare earth atom surface layer portion uneven distribution property can also contribute to an improvement of running durability of the magnetic tape. It is supposed that this may be because uneven distribution of rare earth atoms on a surface of a particle constituting the hexagonal strontium ferrite powder contributes to an improvement of interaction between the particle surface and an organic substance (for example, a binding agent and/or an additive) included in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving the hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in a case of including two or more kinds of rare earth atoms is obtained for the total of two or more kinds of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of further suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-91747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Note that the following dissolution conditions such as the amount of sample powder are exemplified, and dissolution conditions for partial dissolution and total dissolution can be employed in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution thus obtained is performed by an inductively coupled plasma (ICP) analyzer. In this way, the surface layer portion content of a rare earth atom with respect to 100 at % of an iron atom can be obtained. In a case where a plurality of kinds of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 at % of an iron atom can be obtained.

From the viewpoint of increasing the reproduction output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one aspect, σs of the hexagonal strontium ferrite powder may be 45 A·m$^2$/kg or more, and may be 47 A·m$^2$/kg or more. On the other hand, from the viewpoint of noise reduction, σs is preferably 80 A·m$^2$/kg or less and more preferably 60 A·m$^2$/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1 [kOe]=$10^6$/4π [A/m]

Regarding the content (bulk content) of a constituent atom of the hexagonal strontium ferrite powder, a strontium atom content may be, for example, in a range of 2.0 to 15.0 at % with respect to 100 at % of an iron atom. In one aspect, the hexagonal strontium ferrite powder may include only a strontium atom as a divalent metal atom. In another aspect, the hexagonal strontium ferrite powder may include one or more other divalent metal atoms in addition to a strontium atom. For example, a barium atom and/or a calcium atom may be included. In a case where the other divalent metal atoms other than the strontium atom are included, a content of the barium atom and a content of the calcium atom in the hexagonal strontium ferrite powder respectively can be, for example, in a range of 0.05 to 5.0 at % with respect to 100 at % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to one aspect, in the hexagonal strontium ferrite powder, only the M-type crystal structure may be detected by X-ray diffraction analysis. For example, M type hexagonal ferrite is represented by a composition formula of $AFe_{12}O_{19}$. Here, A represents a divalent metal atom, and in a case where the hexagonal strontium ferrite powder is the M type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in one aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving the hexagonal strontium ferrite powder into a value expressed in at % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one aspect, the hexagonal strontium ferrite powder may not include a bismuth atom (Bi).

Metal Powder

Preferred specific examples of the ferromagnetic powder include a ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

Preferred specific examples of the ferromagnetic powder include an ε-iron oxide powder. In the present invention and the present specification, the term "ε-iron oxide powder" refers to a ferromagnetic powder in which an ε-iron oxide type crystal structure is detected as a main phase by X-ray diffraction analysis. For example, in a case where the highest intensity diffraction peak is attributed to an ε-iron oxide type crystal structure in an X-ray diffraction spectrum obtained by X-ray diffraction analysis, it is determined that the ε-iron oxide type crystal structure is detected as the main phase. As a method of manufacturing an ε-iron oxide powder, a manufacturing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the method of manufacturing the ε-iron oxide powder capable of being used as the ferromagnetic powder in the magnetic layer of the magnetic tape is not limited to the methods described here.

An activation volume of the ε-iron oxide powder is preferably in a range of 300 to 1500 nm$^3$. The finely granulated ε-iron oxide powder having an activation volume in the above range is suitable for manufacturing a magnetic tape exhibiting excellent electromagnetic conversion characteristics. The activation volume of the ε-iron oxide powder is preferably 300 nm$^3$ or more, and may be, for example, 500 nm$^3$ or more. Further, from the viewpoint of further improving the electromagnetic conversion characteristics, the activation volume of the ε-iron oxide powder is more preferably 1400 nm³ or less, still more preferably 1300 nm³ or less, still more preferably 1200 nm³ or less, and still more preferably 1100 nm³ or less.

An index for reducing thermal fluctuation, in other words, for improving the thermal stability may include the anisotropy constant Ku. The ε-iron oxide powder preferably has Ku of $3.0 \times 10^4$ J/m³ or more, and more preferably has Ku of $8.0 \times 10^4$ J/m³ or more. Ku of the ε-iron oxide powder may be, for example, $3.0 \times 10^5$ J/m³ or less. Here, since higher Ku means higher thermal stability, which is preferable, a value thereof is not limited to the values exemplified above.

From the viewpoint of increasing the reproduction output in a case of reproducing data recorded on the magnetic tape, it is desirable that mass magnetization σs of the ferromagnetic powder included in the magnetic tape is high. In this regard, in one aspect, σs of the ε-iron oxide powder may be 8 A·m²/kg or more, and may be 12 A·m²/kg or more. On the other hand, from the viewpoint of noise reduction, σs of the ε-iron oxide powder is preferably 40 A·m²/kg or less and more preferably 35 A·m²/kg or less.

In the present invention and the present specification, unless otherwise noted, an average particle size of various powders such as ferromagnetic powders is a value measured by the following method using a transmission electron microscope.

The powder is imaged at an imaging magnification of 100000× with a transmission electron microscope, and the image is printed on printing paper such that the total magnification is 500000×, to obtain an image of particles constituting the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. Further, the aggregate of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of taking a sample powder from the magnetic tape in order to measure the particle size, a method disclosed in a paragraph 0015 of JP2011-048878A can be employed, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter refers to a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %, with respect to the total mass of the magnetic layer. A high filling percentage of the ferromagnetic powder in the magnetic layer is preferable from the viewpoint of improving the recording density.

(Binding Agent)

The magnetic tape can be a coating type magnetic tape, and include a binding agent in the magnetic layer. The binding agent is one or more resins. As the binding agent, various resins usually used as a binding agent of a coating type magnetic tape can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the above binding agent, descriptions disclosed in paragraphs 0028 to 0031 of JP2010-24113A can be referred to. An average molecular weight of the resin used as the binding agent can be, for example, 10,000 to 200,000 as a weight-average molecular weight. The binding agent may be used in an amount of, for example, 1.0 to 30.0 parts by mass with respect to 100.0 parts by mass of the ferromagnetic powder.

(Curing Agent)

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. The curing reaction proceeds in a magnetic layer forming step, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 50.0 to 80.0 parts by mass from the viewpoint of improving a strength of the magnetic layer, with respect to 100.0 parts by mass of the binding agent.

(Additive)

The magnetic layer may include one or more kinds of additives, as necessary. As the additive, a commercially available product can be appropriately selected and used according to a desired property. Alternatively, a compound synthesized by a well-known method can be used as the additive. The additive can be used in any amount. Examples of the additive include the curing agent described above. In addition, examples of the additive which can be included in the magnetic layer include a non-magnetic powder (for example, an inorganic powder or carbon black), a lubricant, a dispersing agent, a dispersing assistant, an antibacterial agent, an antistatic agent, an antioxidant, and the like. For example, for the lubricant, descriptions disclosed in paragraphs 0030 to 0033, 0035, and 0036 of JP2016-126817A can be referred to. The non-magnetic layer which will be described below may include a lubricant. For the lubricant that can be included in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. In addition, a compound having a polyalkyleneimine chain and a vinyl polymer chain can exhibit a function as a dispersing agent for improving dispersibility of the ferromagnetic powder. Furthermore, the above-mentioned compound can also contribute to the improvement of the strength of the magnetic layer. Increasing the strength of the magnetic layer may lead to suppression of the occurrence of show-through, which will be described below. For the compound having a polyalkyleneimine chain and a vinyl polymer chain, descriptions disclosed in paragraphs 0024 to 0064 of JP2019-169225A and Examples of the same publication can be referred to. A content of the compound in the magnetic layer is preferably 0.5 parts by mass or more, more preferably 1.0 part by mass or more, still more preferably 3.0 parts by mass or more, still more preferably 5.0 parts by mass or more, still more preferably 10.0 parts by mass or more, and still more preferably 15.0 parts by mass or more per 100.0 parts by mass of the ferromagnetic powder. In addition, the content of the compound in the magnetic layer is preferably 25.0 parts by mass or less per 100.0 parts by mass of the ferromagnetic powder. One or more kinds of dispersing agents such as the above-described compound may be added to a non-magnetic layer forming composition. For the dispersing agent that can be added to the non-magnetic layer forming composition, a description disclosed in a paragraph 0061 of JP2012-133837A can also be referred to. As the non-magnetic powder that can be included in the magnetic layer, a non-magnetic powder which can function as an abrasive, or a non-magnetic powder which can function as a protrusion forming agent which forms protrusions appropriately protruded from the magnetic layer surface (for example, non-magnetic colloidal particles) is used. For example, for the abrasive, descriptions disclosed in paragraphs 0030 to 0032 of JP2004-273070A can be referred to. As protrusion forming agent, the colloidal particles are preferable, and, from the viewpoint of availability, inorganic colloidal particles are preferable, inorganic oxide colloidal particles are more preferable, and silica colloidal particles (colloidal silica) are still more preferable. An average particle size of each of the abrasive and the protrusion forming agent is preferably in a range of 30 to 200 nm, and more preferably in a range of 50 to 100 nm.

The magnetic layer described above can be provided on a surface of the non-magnetic support directly or indirectly through the non-magnetic layer.

<Non-Magnetic Layer>

Next, the non-magnetic layer will be described. The above magnetic tape may have a magnetic layer directly on the surface of the non-magnetic support, or may have a magnetic layer on the surface of the non-magnetic support through a non-magnetic layer including a non-magnetic powder. The non-magnetic powder used for the non-magnetic layer may be an inorganic substance powder or an organic substance powder. In addition, the carbon black and the like can be used. Examples of the inorganic substance include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %, with respect to the total mass of the non-magnetic layer.

The non-magnetic layer can include a binding agent, and can also include an additive. For other details of the binding agent or the additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

The non-magnetic layer of the present invention and the present specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and coercivity.

<Non-Magnetic Support>

Examples of the non-magnetic support (hereinafter, also simply referred to as a "support") include well-known components such as polyethylene terephthalate, polyethylene naphthalate, polyamide, polyamideimide, and aromatic polyamide subjected to biaxial stretching. Among these, polyethylene terephthalate and polyethylene naphthalate are preferable.

In one aspect, the non-magnetic support of the magnetic tape can be an aromatic polyester support. In the present invention and the present specification, the term "aromatic polyester" means a resin containing an aromatic skeleton and a plurality of ester bonds, and the "aromatic polyester support" means a support containing at least one aromatic polyester film. The term "aromatic polyester film" refers to a film in which a component that accounts for the largest amount on a mass basis among components constituting the film is an aromatic polyester. The term "aromatic polyester support" in the present invention and the present specification includes those in which all resin films contained in the support are aromatic polyester films, and those containing the aromatic polyester film and another resin film. Specific aspects of the aromatic polyester support include a single-layer aromatic polyester film, a laminated film of two or more aromatic polyester films having the same constituent components, a laminated film of two or more aromatic polyester films having different constituent components, a laminated film including one or more aromatic polyester films and one or more resin films other than the aromatic polyester, and the like. An adhesive layer or the like may be optionally included between two adjacent layers in the laminated film. The aromatic polyester support may optionally include a metal film and/or a metal oxide film formed on one or both surfaces by vapor deposition or the like. The same applies to a "polyethylene terephthalate support" and a "polyethylene naphthalate support" in the present invention and the present specification.

An aromatic ring contained in the aromatic skeleton of the aromatic polyester is not particularly limited. Specific examples of the aromatic ring include a benzene ring and a naphthalene ring.

For example, polyethylene terephthalate (PET) is a polyester containing a benzene ring, and is a resin obtained by polycondensing ethylene glycol with terephthalic acid and/or dimethyl terephthalate. The "polyethylene terephthalate" in the present invention and this specification includes those having a structure having one or more other components (for example, a copolymer component, a component introduced into a terminal or a side chain, or the like) in addition to the above component.

Polyethylene naphthalate (PEN) is a polyester containing a naphthalene ring, and is a resin obtained by performing an esterification reaction between dimethyl 2,6-naphthalenedicarboxylate and ethylene glycol and then performing a transesterification reaction and a polycondensation reaction. The term "polyethylene naphthalate" in the present invention and the present specification includes those having a structure having one or more other components (for example, a copolymer component, a component introduced into a terminal or a side chain, or the like) in addition to the above component.

The non-magnetic support may be a biaxially stretched film, and may be a film that has been subjected to corona discharge, a plasma treatment, an easy-bonding treatment, a heat treatment, or the like.

<Back Coating Layer>

The magnetic tape may or may not have a back coating layer including a non-magnetic powder on a surface side of the non-magnetic support opposite to a surface side having the magnetic layer. For the non-magnetic powder of the back coating layer, the above description regarding the non-magnetic powder in the non-magnetic layer can be referred to.

The recess on the magnetic layer surface can be formed by transferring a surface shape of a back surface to the magnetic layer surface (so-called show-through) in a state in which the magnetic layer surface and the back surface are in contact in a rolled state in the manufacturing step of the magnetic tape. The back surface is a back coating layer surface in a case where the back coating layer is provided, and is a support surface in a case where the back coating layer is not provided. One example of a control method of the existence state of the recess on the magnetic layer surface is to select a kind of a component to be added to the composition for forming the back coating layer, for example, in order to adjust the surface shape of the back surface. From this point, as the non-magnetic powder of the back coating layer, it is preferable to use carbon black and a non-magnetic powder other than carbon black in combination, or to use carbon black (that is, the non-magnetic powder of the back coating layer is composed of carbon black). Examples of the non-magnetic powder other than carbon black include the non-magnetic powder exemplified above as a non-magnetic powder that can be contained in the non-magnetic layer. For the non-magnetic powder of the back coating layer, a ratio of carbon black to 100.0 parts by mass of the total amount of the non-magnetic powder is preferably in a range of 50.0 to 100.0 parts by mass, more preferably in a range of 70.0 to 100.0 parts by mass, and still more preferably in a range of 90.0 to 100.0 parts by mass. In addition, it is preferable that the total amount of the non-magnetic powder of the back coating layer is carbon black. The content (filling percentage) of the non-magnetic powder in the back coating layer is preferably in a range of 50 to 90 mass % and more preferably in a range of 60 to 90 mass % with respect to the total mass of the back coating layer.

From the viewpoint of ease of control of the number of the recesses existing on the magnetic layer surface and having an equivalent circle diameter in the above-described range, in one aspect, as the non-magnetic powder of the back coating layer, it is preferable to use a non-magnetic powder having an average particle size of 50 nm or less. As the non-magnetic powder of the back coating layer, only one kind of the non-magnetic powder may be used, or two or more kinds of the non-magnetic powders may be used. In a case where two or more kinds (for example, carbon black and a non-magnetic powder other than carbon black) are used, an average particle size of each is preferably 50 nm or less. The average particle size of the non-magnetic powder is more preferably in a range of 10 to 50 nm, and still more preferably in a range of 10 to 30 nm. In one aspect, it is preferable that the total amount of the non-magnetic powder contained in the back coating layer is carbon black, and that the average particle size thereof is 50 nm or less.

In order to control the existence state of the recess on the magnetic layer surface, a back coating layer forming composition preferably contains a component (dispersing agent) capable of improving dispersibility of the non-magnetic powder contained in the composition. The back coating layer forming composition more preferably contains a non-magnetic powder having an average particle size of 50 nm or less and a component capable of improving dispersibility of the non-magnetic powder, and still more preferably contains carbon black having an average particle size of 50 nm or less and a component capable of improving dispersibility of the carbon black.

As an example of such a dispersing agent, a compound having an ammonium salt structure of an alkyl ester anion represented by Formula 1 can be used. The "alkyl ester anion" can also be called an "alkyl carboxylate anion".

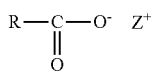

Formula 1

In Formula 1, R represents an alkyl group having 7 or more carbon atoms or a fluorinated alkyl group having 7 or more carbon atoms, and $Z^+$ represents an ammonium cation.

From the viewpoint of improving the dispersibility of carbon black, in one aspect, two or more kinds of components capable of forming the compound having a salt structure can be used in a case of preparing the back coating layer forming composition. Thereby, in a case where the back coating layer forming composition is prepared, at least a part of these components can form the compound having a salt structure.

Unless otherwise noted, groups described below may have a substituent or may be unsubstituted. In addition, for a group having a substituent, the term "carbon atoms" means the number of carbon atoms not including the number of carbon atoms of the substituent, unless otherwise noted. In the present invention and the present specification, examples of the substituent include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, a bromine atom, or the like), a cyano group, an amino group, a nitro group, an acyl group, a carboxy group, a salt of a carboxy group, a sulfonic acid group, and a salt of a sulfonic acid group.

Hereinafter, Formula 1 will be described in more detail.

In Formula 1, R represents an alkyl group having 7 or more carbon atoms or a fluorinated alkyl group having 7 or more carbon atoms. The fluorinated alkyl group has a structure in which some or all of the hydrogen atoms constituting the alkyl group are substituted with fluorine atoms. The alkyl group or the fluorinated alkyl group represented by R may have a linear structure or a branched structure, may be a cyclic alkyl group or a fluorinated alkyl group, and is preferably a linear structure. The alkyl group or the fluorinated alkyl group represented by R may have a substituent, may be unsubstituted, and is preferably unsubstituted. The alkyl group represented by R can be represented by, for example, $CH_{2n+1}$—. Here, n represents an integer of 7 or more. In addition, the fluorinated alkyl group represented by R may have a structure in which some or all of the hydrogen atoms constituting the alkyl group represented by, for example, $C_nH_{2n+1}$— are substituted with fluorine atoms. The number of carbon atoms of the alkyl group or the fluorinated alkyl group represented by R is 7 or more, preferably 8 or more, more preferably 9 or more, still more preferably 10 or more, still more preferably 11 or more, still more preferably 12 or more, and still more preferably 13 or more. In addition, the number of carbon atoms of the alkyl group or the fluorinated alkyl group represented by R is preferably 20 or less, more preferably 19 or less, and still more preferably 18 or less.

In Formula 1, $Z^+$ represents an ammonium cation. Specifically, the ammonium cation has the following structure. In the present invention and the present specification, "*" in the formula representing a part of a compound represents a bonding position between a structure of the part and an adjacent atom.

A nitrogen cation $N^+$ of the ammonium cation and an oxygen anion $O^-$ in Formula 1 may form a salt crosslinking group to form the ammonium salt structure of the alkyl ester anion represented by Formula 1. The fact that the compound having the ammonium salt structure of the alkyl ester anion represented by Formula 1 is contained in the back coating layer can be confirmed by analyzing the magnetic tape by X-ray photoelectron spectroscopy (electron spectroscopy for chemical analysis (ESCA)), infrared spectroscopy (IR), or the like.

In one aspect, the ammonium cation represented by $Z^+$ may be provided, for example, by a nitrogen atom of a nitrogen-containing polymer being a cation. The nitrogen-containing polymer means a polymer including a nitrogen atom. In the present invention and the present specification, the term "polymer" is used to encompass a homopolymer and a copolymer. The nitrogen atom may be included as an atom constituting a main chain of the polymer in one aspect, and may be included as an atom constituting a side chain of the polymer in one aspect.

As one aspect of the nitrogen-containing polymer, polyalkyleneimine can be exemplified. Polyalkyleneimine is a ring-opening polymer of alkyleneimine and is a polymer having a plurality of repeating units represented by Formula 2.

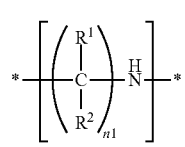

Formula 2

The ammonium cation represented by $Z^+$ in Formula 1 may be provided by a nitrogen atom N constituting a main chain in Formula 2 being a nitrogen cation $N^+$. Then, the ammonium salt structure can be formed with the alkyl ester anion, for example, as follows.

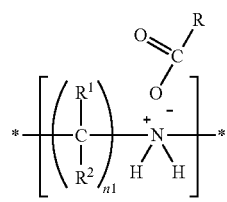

Hereinafter, Formula 2 will be described in more detail.

In Formula 2, $R^1$ and $R^2$ each independently represent a hydrogen atom or an alkyl group, and n1 represents an integer of 2 or more.

Examples of the alkyl group represented by $R^1$ or $R^2$ include an alkyl group having 1 to 6 carbon atoms, preferably an alkyl group having 1 to 3 carbon atoms, more preferably a methyl group or an ethyl group, and still more preferably a methyl group. The alkyl group represented by $R^1$ or $R^2$ is preferably an unsubstituted alkyl group. The combination of $R^1$ and $R^2$ in Formula 2 may be a form in which one is a hydrogen atom and the other is an alkyl group, a form in which both are hydrogen atoms, and a form in which both are alkyl groups (the same or different alkyl groups), and the form in which both are hydrogen atoms is preferable. As the alkyleneimine that provides the polyalkyleneimine, a structure having the lowest number of carbon atoms constituting a ring is ethyleneimine, and the number of carbon atoms in a main chain of the alkyleneimine (ethyleneimine) obtained by the ring opening of the ethyleneimine is 2. Therefore, n1 in Formula 2 is 2 or more. n1 in Formula 2 may be, for example, 10 or less, 8 or less, 6 or less, or 4 or less. The polyalkyleneimine may be a homopolymer including only the same structure as the repeating structure represented by Formula 2, or may be a copolymer including two or more different structures as the repeating structure represented by Formula 2. A number-average molecular weight of polyalkyleneimine that can be used to form the compound having the ammonium salt structure of the alkyl ester anion represented by Formula 1 may be, for example, 200 or more, preferably 300 or more, and more preferably 400 or more. The number-average molecular weight of the polyalkyleneimine may be, for example, 10,000 or less, preferably 5,000 or less, and more preferably 2,000 or less.

In the present invention and the present specification, the average molecular weight (weight-average molecular weight and number-average molecular weight) means a value measured by gel permeation chromatography (GPC) with standard polystyrene conversion. Unless otherwise noted, the average molecular weight shown in Examples described below is a value (polystyrene conversion value) obtained by standard polystyrene conversion of values measured under the following measurement conditions using GPC.

GPC device: HLC-8220 (manufactured by Tosoh Corporation)

Guard column: TSKguardcolumn Super HZM-H

Column: TSKgel Super HZ 2000, TSKgel Super HZ 4000, TSKgel Super HZ-M (manufactured by Tosoh Corporation, 4.6 mm (inner diameter)×15.0 cm, three columns connected in series)

Eluent: Tetrahydrofuran (THF), containing stabilizer (2,6-di-t-butyl-4-methylphenol)

Flow rate of eluent: 0.35 mL/min

Column temperature: 40° C.

Inlet temperature: 40° C.

Refractive index (RI) measurement temperature: 40° C.

Sample concentration: 0.3 mass %

Sample injection amount: 10 µL

As another aspect of the nitrogen-containing polymer, polyallylamine can be exemplified. Polyallylamine is a polymer of allylamine and is a polymer having a plurality of repeating units represented by Formula 3.

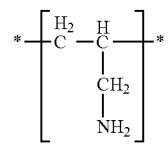

Formula 3

The ammonium cation represented by $Z^+$ in Formula 1 may be provided by a nitrogen atom N constituting an amino group of a side chain in Formula 3 being a nitrogen cation $N^+$. Then, the ammonium salt structure can be formed with the alkyl ester anion, for example, as follows.

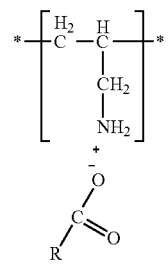

A weight-average molecular weight of polyallylamine that can be used to form the compound having the ammonium salt structure of the alkyl ester anion represented by Formula 1 may be, for example, 200 or more, preferably 1,000 or more, and more preferably 1,500 or more. A weight-average molecular weight of the polyalkyleneimine may be, for example, 15,000 or less, preferably 10,000 or less, and more preferably 8,000 or less.

The fact that a compound having a structure derived from polyalkyleneimine or polyallylamine as the compound having the ammonium salt structure of the alkyl ester anion represented by Formula 1 is contained in the back coating layer can be confirmed by analyzing the back coating layer surface by time-of-flight secondary ion mass spectrometry (TOF-SIMS) or the like.

The compound having the ammonium salt structure of the alkyl ester anion represented by Formula 1 may be a salt of the nitrogen-containing polymer and one or more kinds of fatty acids selected from the group consisting of fatty acids having 7 or more carbon atoms and fluorinated fatty acids having 7 or more carbon atoms. The nitrogen-containing polymer forming a salt may be one or more kinds of nitrogen-containing polymers, and may be, for example, a nitrogen-containing polymer selected from the group consisting of polyalkyleneimine and polyallylamine. The fatty acids forming a salt may be one or more kinds of fatty acids selected from the group consisting of fatty acids having 7 or more carbon atoms and fluorinated fatty acids having 7 or more carbon atoms. The fluorinated fatty acid has a structure in which some or all of the hydrogen atoms constituting an alkyl group bonded to a carboxy group COOH in the fatty acid are substituted with fluorine atoms. For example, the salt forming reaction can easily proceed by mixing the nitrogen-containing polymer and the above fatty acids at a room temperature. A room temperature is, for example, about 20° C. to 25° C. In one aspect, one or more kinds of nitrogen-containing polymers and one or more kinds of fatty acids are used as components of the back coating layer forming composition, and these are mixed in a step of preparing the back coating layer forming composition to allow the salt forming reaction to proceed. In addition, in one aspect, the back coating layer forming composition can be prepared by mixing one or more kinds of nitrogen-containing polymers and one or more kinds of the fatty acids to form a salt before preparation of the back coating layer forming composition, and then using the salt as a component of the back coating layer forming composition. In a case where the nitrogen-containing polymer and the fatty acids are mixed to form an ammonium salt of the alkyl ester anion represented by Formula 1, a nitrogen atom constituting the nitrogen-containing polymer may react with a carboxy group of the fatty acids to form the following structure, and a form including such a structure is also included in the compound.

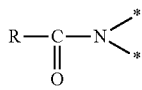

Examples of the fatty acids include fatty acids having an alkyl group described above as R in Formula 1 and fluorinated fatty acids having a fluorinated alkyl group described above as R in Formula 1.

A mixing ratio of the nitrogen-containing polymer used to form the compound having the ammonium salt structure of the alkyl ester anion represented by Formula 1 to the fatty acid is preferably 10:90 to 90:10, more preferably 20:80 to 85:15, and still more preferably 30:70 to 80:20 as a mass ratio of the nitrogen-containing polymer:the fatty acids. The compound having the ammonium salt structure of the alkyl ester anion represented by Formula 1 can be used, for example, in an amount of 1.0 to 20.0 parts by mass and is preferably used in an amount of 1.0 to 10.0 parts by mass with respect to 100.0 parts by mass of the carbon black, in a case where the back coating layer forming composition is prepared. In addition, for example, in a case where the back coating layer forming composition is prepared, 0.1 to 10.0 parts by mass of the nitrogen-containing polymer can be used, and 0.5 to 8.0 parts by mass of the nitrogen-containing polymer is preferably used, per 100.0 parts by mass of the carbon black. The above fatty acids can be used, for example, in an amount of 0.05 to 10.0 parts by mass and are preferably used in an amount of 0.1 to 5.0 parts by mass, per 100.0 parts by mass of the carbon black.

Regarding the components that can be included in the back coating layer, the back coating layer can include a binding agent and can also include an additive. Regarding the binding agent and additive in the back coating layer, a well-known technology for the back coating layer can be applied, and a well-known technology for the formulation of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

<Various Thicknesses>

Regarding a thickness (total thickness) of the magnetic tape, it has been required to increase the recording capacity (increase the capacity) of the magnetic recording medium with the enormous increase in the amount of information in recent years. As means for increasing the capacity of a tape-shaped magnetic recording medium (that is, a magnetic tape), a thickness of the magnetic tape may be reduced to increase a length of the magnetic tape accommodated in one roll of a magnetic tape cartridge. From this point, the thickness (total thickness) of the magnetic tape is preferably 5.6 μm or less, more preferably 5.5 μm or less, still more preferably 5.4 μm or less, still more preferably 5.3 μm or less, and still more preferably 5.2 μm or less. In addition, from the viewpoint of ease of handling, the thickness of the magnetic tape is preferably 3.0 μm or more, and more preferably 3.5 μm or more.

The thickness (total thickness) of the magnetic tape can be measured by the following method.

Ten samples (for example, 5 to 10 cm in length) are cut out from any part of the magnetic tape, and these samples are stacked to measure the thickness. A value (thickness per sample) obtained by dividing the measured thickness by 1/10 is set as the total thickness. The thickness measurement can be performed using a well-known measuring instrument capable of measuring a thickness on the order of 0.1 μm.

A thickness of the non-magnetic support is preferably 3.0 to 5.0 μm.

A thickness of the magnetic layer can be optimized according to a saturation magnetization amount of a magnetic head used, a head gap length, a band of a recording signal, and the like, and is generally 0.01 μm to 0.15 μm, and, from the viewpoint of high-density recording, the thickness is preferably 0.02 μm to 0.12 μm and more preferably 0.03 μm to 0.1 μm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less, and more preferably 0.1 to 0.7 μm.

Various thicknesses such as the thickness of the magnetic layer and the like can be obtained by the following method.

A cross section of the magnetic tape in a thickness direction is exposed by an ion beam, and then observation on the exposed cross section is performed using a scanning electron microscope. Various thicknesses can be obtained as an arithmetic average of thicknesses obtained at two optional points in the cross section observation. Alternatively, the various thicknesses can be obtained as a designed thickness calculated according to manufacturing conditions.

<Manufacturing Step>

(Preparation of Each Layer Forming Composition)

A composition for forming the magnetic layer, the non-magnetic layer, or the back coating layer usually includes a solvent together with the various components described above. As a solvent, one or more kinds of various solvents usually used for manufacturing a coating type magnetic recording medium can be used. A solvent content of each layer forming composition is not particularly limited. For the solvent, a description disclosed in a paragraph 0153 of JP2011-216149A can be referred to. The concentration of solid contents and the solvent composition of each layer forming composition need only be appropriately adjusted in accordance with the handling suitability of the composition, the coating conditions, and the thickness of each layer to be formed. A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Various components used in the preparation of each layer forming composition may be added at the beginning or during any step. In addition, each component may be separately added in two or more steps. For example, a binding agent may be added separately in a kneading step, a dispersing step, and a mixing step for adjusting a viscosity after dispersion. In the manufacturing step of the magnetic tape, a well-known manufacturing technology in the related art can be used in a part of the steps. In the kneading step, an open kneader, a continuous kneader, a pressure kneader, or a kneader having a strong kneading force such as an extruder can be used. Details of the kneading step are disclosed in JP1989-106338A (JP-H1-106338A) and JP1989-79274A (JP-H1-79274A). As a disperser, various well-known dispersers using a shearing force, such as a beads mill, a ball mill, a sand mill, or a homomixer, can be used. Dispersion beads can be preferably used for the dispersion. Examples of the dispersion beads include ceramic beads and glass beads, and zirconia beads are preferable. Two or more kinds of beads may be used in combination. A bead diameter (particle size) and a bead filling rate of the dispersion beads are not particularly limited and need only be set depending on a powder to be dispersed. Each layer forming composition may be filtered by a well-known method before performing the coating step. The filtering can be performed by using a filter, for example. As the filter used in the filtering, a filter having a pore diameter of 0.01 to 3 μm (for example, a filter made of glass fiber or a filter made of polypropylene) can be used, for example.

(Coating Step)

The magnetic layer can be formed by directly applying the magnetic layer forming composition onto the non-magnetic support surface or performing multilayer applying of the magnetic layer forming composition with the non-magnetic layer forming composition sequentially or simultaneously. The back coating layer can be formed by applying a back coating layer forming composition onto a surface of the non-magnetic support opposite to a surface having the non-magnetic layer and/or the magnetic layer (or to be provided with the non-magnetic layer and/or the magnetic layer). For details of the coating for forming each layer, a description disclosed in a paragraph 0066 of JP2010-231843A can be referred to.

(Other Steps)

Well-known technologies can be applied to other various steps for manufacturing the magnetic tape. Regarding the various steps, the descriptions disclosed in paragraphs 0067 to 0070 of JP2010-231843A can be referred to, for example. For example, a coating layer of the magnetic layer forming composition can be subjected to an alignment treatment in an alignment zone while the coating layer is in a wet state. For the alignment treatment, the various well-known technologies including a description disclosed in a paragraph 0052 of JP2010-24113A can be used. For example, a vertical alignment treatment can be performed by a well-known method such as a method using a polar opposing magnet. In the alignment zone, a drying speed of the coating layer can be controlled depending on a temperature of dry air and an air volume and/or a transportation speed in the alignment zone. Further, the coating layer may be preliminarily dried before the transportation to the alignment zone. As an example, a magnetic field intensity in the vertical alignment treatment may be 0.1 to 1.5 T.

For the magnetic tape, a long magnetic tape original roll can be obtained through various steps. The obtained magnetic tape original roll is cut (slit) by a well-known cutter to have a width of the magnetic tape to be wound around the magnetic tape cartridge. The width is determined according to the standard, and is usually ½ inches. ½ inches=12.65 mm. A servo pattern is usually formed on the magnetic tape obtained by slitting. Details of the servo pattern will be described below. The magnetic tape is usually accommodated in a magnetic tape cartridge and the magnetic tape cartridge is mounted on the magnetic tape apparatus. In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to the winding reel. Feeding and winding of the magnetic tape are performed between a reel (supply reel) on the magnetic tape cartridge side and a reel (winding reel) on the magnetic tape apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge.

(Formation of Servo Pattern)

It is possible to form a servo pattern in the magnetic tape by a well-known method in order to enable tracking control of the magnetic head in the magnetic tape apparatus, control of a running speed of the magnetic tape, and the like. The term "formation of servo pattern" can also be referred to as "recording of servo signal". The information on the dimensions in the width direction of the magnetic tape during running can be acquired using the servo signal, and the tension applied in a longitudinal direction of the magnetic tape can be adjusted and changed according to the acquired dimension information, thereby controlling the dimensions in the width direction of the magnetic tape.

The formation of the servo pattern will be described below.

The servo pattern is usually formed along a longitudinal direction of the magnetic tape. Examples of control (servo control) systems using a servo signal include a timing-based servo (TBS), an amplitude servo, and a frequency servo.

As shown in a European computer manufacturers association (ECMA)-319 (June 2001), a magnetic tape conforming to a linear tape-open (LTO) standard (generally called "LTO tape") employs a timing-based servo system. In this timing-based servo system, the servo pattern is formed by continuously arranging a plurality of pairs of non-parallel magnetic stripes (also referred to as "servo stripes") in the longitudinal direction of the magnetic tape. The servo system is a system that performs head tracking using servo signals. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. Regions interposed between two adjacent servo bands are data bands. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

In a method of uniquely specifying the servo band, a staggered method as shown in ECMA-319 (June 2001) is used. In this staggered method, a group of pairs of non-parallel magnetic stripes (servo stripes) arranged continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two additional methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

[Magnetic Head]

In the present invention and the present specification, the term "magnetic tape apparatus" means an apparatus capable of performing at least one of the recording of data on the magnetic tape or the reproduction of data recorded on the magnetic tape. Such an apparatus is generally called a drive. The magnetic head included in the magnetic tape apparatus can be a recording head capable of performing the recording of data on the magnetic tape, or can be a reproducing head capable of performing the reproducing of data recorded on the magnetic tape. In addition, in one aspect, the magnetic tape apparatus can include both a recording head and a reproducing head as separate magnetic heads. In another aspect, the magnetic head included in the magnetic tape apparatus can have a configuration in which both a recording element and a reproducing element are provided in one magnetic head. As the reproducing head, a magnetic head (MR head) including a magnetoresistive (MR) element capable of sensitively reading information recorded on the magnetic tape as a reproducing element is preferable. As the MR head, various well-known MR heads (for example, a giant magnetoresistive (GMR) head and a tunnel magnetoresistive (TMR) head) can be used. In addition, the magnetic head which performs the recording of data and/or the reproduction of data may include a servo pattern reading element. Alternatively, as a head other than the magnetic head which performs the recording of data and/or the reproduction of data, a magnetic head (servo head) comprising a servo pattern reading element may be included in the magnetic tape apparatus. For example, a magnetic head that records data and/or reproduces recorded data (hereinafter also referred to as "recording and reproducing head") can include two servo signal reading elements, and the two servo signal reading elements can simultaneously read two servo bands adjacent to each other with the data band interposed therebetween. One or a plurality of elements for data can be disposed between the two servo signal reading elements. An element for recording data (recording element) and an element for reproducing data (reproducing element) are collectively referred to as an "element for data".

By reproducing data using a reproducing element having a narrow reproducing element width as a reproducing element, data recorded at high-density can be reproduced with high sensitivity. From this viewpoint, the reproducing element width of the reproducing element is preferably 0.8 μm or less. The reproducing element width of the reproducing element may be, for example, 0.3 μm or more. Note that it is also preferable to be lower than this value from the above viewpoint.

On the other hand, as the reproducing element width becomes narrower, a phenomenon such as reproduction failure due to off-track is more likely to occur. In order to suppress occurrence of such a phenomenon, the magnetic tape apparatus that controls the dimension in the width direction of the magnetic tape by adjusting and changing the tension applied in the longitudinal direction of the magnetic tape during running is preferable.

Here, the term "reproducing element width" means a physical dimension of the reproducing element width. Such a physical dimension can be measured by an optical microscope, a scanning electron microscope, or the like.

In a case of recording data and/or reproducing recorded data, first, head tracking using the servo signal can be performed. That is, by causing the servo signal reading element to follow a predetermined servo track, the element for data can be controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

Figure 2:
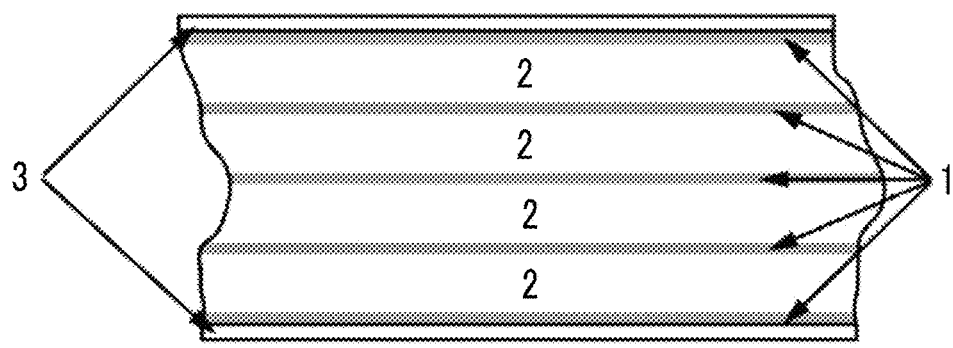
FIG. 2 shows an arrangement example of data bands and servo bands.
Figure 3:
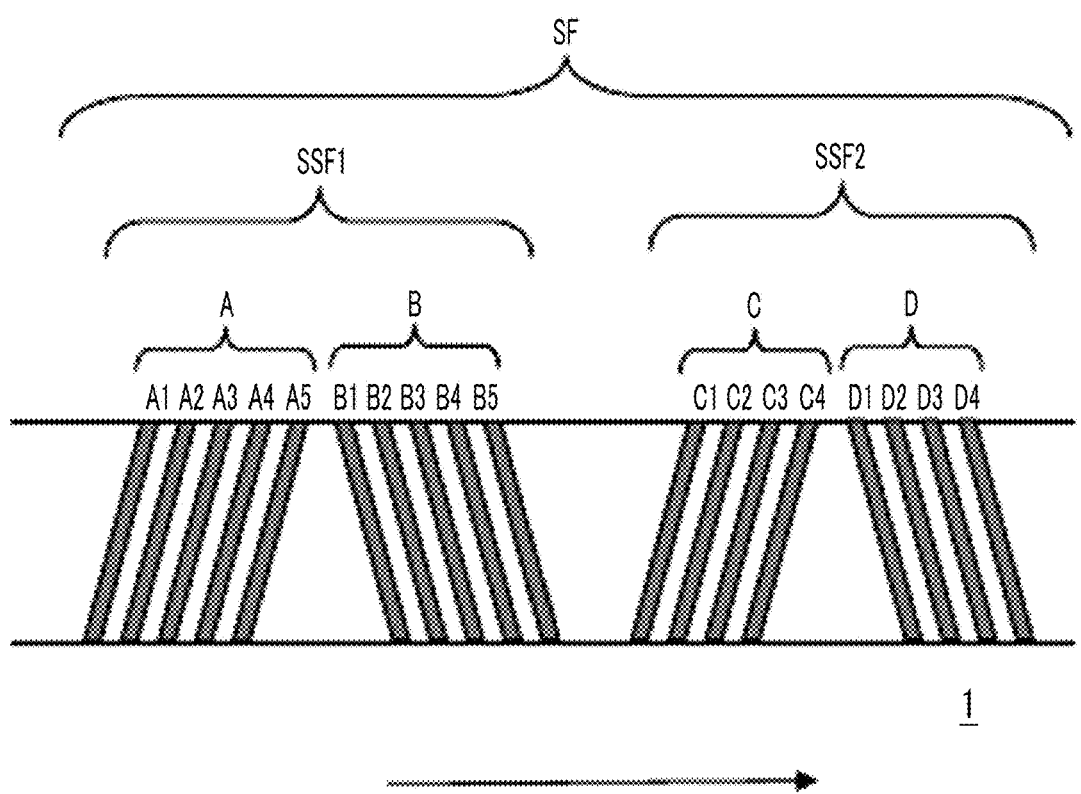
FIG. 3 shows an arrangement example of a servo pattern of a linear tape-open (LTO) Ultrium format tape.

FIG. 2 shows an arrangement example of data bands and servo bands. In FIG. 2, a plurality of servo bands 1 are arranged to be interposed between guide bands 3 in a magnetic layer of a magnetic tape MT. A plurality of regions 2 interposed between two servo bands are data bands. The servo pattern is a magnetization region, and is formed by magnetizing a specific region of the magnetic layer by the servo write head. A region magnetized by the servo write head (a position where the servo pattern is formed) is determined by the standard. For example, in an LTO Ultrium format tape which is based on a local standard, a plurality of servo patterns inclined with respect to a tape width direction as shown in FIG. 3 are formed on a servo band, in a case of manufacturing a magnetic tape. Specifically, in FIG. 3, a servo frame SF on the servo band 1 is composed of a servo sub-frame 1 (SSF1) and a servo sub-frame 2 (SSF2). The servo sub-frame 1 is composed of an A burst (in FIG. 3, reference numeral A) and a B burst (in FIG. 3, reference numeral B). The A burst is composed of servo patterns A1 to A5 and the B burst is composed of servo patterns B1 to B5. Meanwhile, the servo sub-frame 2 is composed of a C burst (in FIG. 3, reference numeral C) and a D burst (in FIG. 3, reference numeral D). The C burst is composed of servo patterns C1 to C4 and the D burst is composed of servo patterns D1 to D4. Such 18 servo patterns are arranged in the sub-frames in an array of 5, 5, 4, 4, as the sets of 5 servo patterns and 4 servo patterns, and are used for identifying the servo frames. FIG. 3 shows one servo frame for description. Note that, in practice, a plurality of the servo frames are arranged in the running direction in each servo band in the magnetic layer of the magnetic tape on which the head tracking of the timing-based servo system is performed. In FIG. 3, an arrow shows the running direction. For example, an LTO Ultrium format tape usually has 5000 or more servo frames per 1 m of tape length in each servo band of the magnetic layer.

EXAMPLES

Hereinafter, the present invention will be described based on Examples. Note that the present invention is not limited to aspects shown in Examples. "Parts" and "%" in the following description mean "parts by mass" and "mass %", unless otherwise specified. The steps and evaluations in the following description were performed in an environment of an atmosphere temperature of 23° C.±1° C., unless otherwise noted. In addition, "eq" described below indicates an equivalent that is a unit that cannot be converted into an SI unit system.

[Non-Magnetic Support]

In Table 1, "PEN" indicates a polyethylene naphthalate support, and "PET" indicates a polyethylene terephthalate support.

[Ferromagnetic Powder]

In Table 1 described below, "BaFe" in the column of the type of a ferromagnetic powder indicates a hexagonal barium ferrite powder having an average particle size (average plate diameter) of 21 nm.

In Table 1, "SrFe1" in the column of the type of a ferromagnetic powder indicates a hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the manufactured amorphous body was charged into an electric furnace, was heated to 635° C. (crystallization temperature) at a temperature rising rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an internal temperature of the furnace of 110° C. for 6 hours to obtain a hexagonal strontium ferrite powder.

An average particle size of the hexagonal strontium ferrite powder obtained above was 18 nm, an activation volume was 902 nm$^3$, an anisotropy constant Ku was 2.2×10$^5$ J/m$^3$, and a mass magnetization σs was 49 A·m$^2$/kg.

12 mg of a sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees In Table 1, "SrFe2" in the column of the type of a ferromagnetic powder indicates a hexagonal strontium ferrite powder manufactured by the following method.

1725 g of SrCO$_3$, 666 g of H$_3$BO$_3$, 1332 g of Fe$_2$O$_3$, 52 g of Al(OH)$_3$, 34 g of CaCO$_3$, and 141 g of BaCO$_3$ were weighed and mixed by a mixer to obtain a raw material mixture.

The obtained raw material mixture was melted in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the obtained amorphous body was charged into an electric furnace, was heated to 645° C. (crystallization temperature), and was held at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an internal temperature of the furnace of 110° C. for 6 hours to obtain a hexagonal strontium ferrite powder.

An average particle size of the obtained hexagonal strontium ferrite powder was 19 nm, an activation volume was 1102 nm$^3$, an anisotropy constant Ku was 2.0×10$^5$ J/m$^3$, and a mass magnetization σs was 50 A·m$^2$/kg.

In Table 1, "ε-Iron oxide" in the column of the type of a ferromagnetic powder indicates an ε-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. A powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was mounted in a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70°

C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide ($\epsilon$-$Ga_{0.28}Co_{0.05}Ti_{0.05}Fe_{1.62}O_3$). In addition, X-ray diffraction analysis is performed under the same condition as that described above for the hexagonal strontium ferrite powder SrFe1, and from a peak of an X-ray diffraction pattern, it is checked that the obtained ferromagnetic powder does not include α-phase and γ-phase crystal structures, and has a single-phase and ε-phase crystal structure (ε-iron oxide type crystal structure).

The obtained ε-iron oxide powder had an average particle size of 12 nm, an activation volume of 746 nm$^3$, an anisotropy constant Ku of $1.2 \times 10^5$ J/m$^3$, and a mass magnetization σs of 16 A·m$^2$/kg.

An activation volume and an anisotropy constant Ku of the above hexagonal strontium ferrite powder and ε-iron oxide powder are values obtained by the method described above using a vibrating sample magnetometer (manufactured by Toei Industry Co., Ltd.) for each ferromagnetic powder.

In addition, a mass magnetization σs is a value measured at a magnetic field intensity of 1194 kA/m (15 kOe) using a vibrating sample magnetometer (manufactured by Toei Industry Co., Ltd.).

Example 1

(1) Formulation of Magnetic Layer Forming Composition
(Magnetic Liquid)
  Ferromagnetic powder (see Table 1): 100.0 parts
  Dispersing agent: see Table 1
  SO$_3$Na group-containing polyurethane resin: 14.0 parts
    Weight-average molecular weight: 70,000, SO$_3$Na group: 0.4 meq/g
  Cyclohexanone: 150 parts
  Methyl ethyl ketone: 150 parts
(Abrasive Solution A)
  Alumina abrasive (average particle size: 100 nm): 3.0 parts
  Sulfonic acid group-containing polyurethane resin: 0.3 parts
    Weight-average molecular weight: 70,000, SO$_3$Na group: 0.3 meq/g
  Cyclohexanone: 26.7 parts
(Abrasive Solution B)
  Diamond abrasive (average particle size: 100 nm): 1.0 part
  Sulfonic acid group-containing polyurethane resin: 0.1 parts
    Weight-average molecular weight: 70,000, SO$_3$Na group: 0.3 meq/g
  Cyclohexanone: 26.7 parts
(Silica Sol)
  Colloidal silica (average particle size: 100 nm): 0.2 parts
  Methyl ethyl ketone: 1.4 parts
  Other Components
  Stearic acid: 2.0 parts
  Butyl stearate: 10.0 parts
  Polyisocyanate (CORONATE manufactured by Nippon Polyurethane Co., Ltd.): 2.5 parts
  Cyclohexanone: 200.0 parts
  Methyl ethyl ketone: 200.0 parts The dispersing agent is a compound (a compound having a polyalkyleneimine chain and a vinyl polymer chain) disclosed as a component of a magnetic layer forming composition of Example 1 in JP2019-169225A. As a component of the magnetic layer forming composition, a reaction solution obtained after the synthesis of the above-described compound was used. A content of the dispersing agent in the magnetic layer shown in Table 1 below is the amount of the above-described compound in such a reaction solution.

(2) Formulation of Non-Magnetic Layer Forming Composition
  Non-magnetic inorganic powder (α-iron oxide): 100.0 parts
    Average particle size (average long axis length): 10 nm
    Average acicular ratio: 1.9
    Brunauer-emmett-teller (BET) specific surface area: 75 m$^2$/g
  Carbon black: 25.0 parts
    Average particle size: 20 nm
  SO$_3$Na group-containing polyurethane resin: 18 parts
    Weight-average molecular weight: 70,000, SO$_3$Na group: 0.2 meq/g
  Stearic acid: 1.0 part
  Cyclohexanone: 300.0 parts
  Methyl ethyl ketone: 300.0 parts (3) Formulation of Back Coating Layer Forming Composition
  Carbon black: 100.0 parts
  BP-800 manufactured by Cabot Corporation, average particle size: 17 nm
  SO$_3$Na group-containing polyurethane resin (SO$_3$Na group: 70 eq/ton): 20.0 parts
  OSO$_3$K group-containing vinyl chloride resin (OSO$_3$K group: 70 eq/ton): 30.0 parts
  Polyethyleneimine (manufactured by Nippon Shokubai Co., Ltd., number-average molecular weight of 600): see Table 1
  Stearic acid: see Table 1
  Cyclohexanone: 140.0 parts
  Methyl ethyl ketone: 170.0 parts
  Butyl stearate: 2.0 parts
  Stearic acid amide: 0.1 parts (4) Preparation of Magnetic Tape
The above-mentioned components of the magnetic liquid were dispersed for 24 hours using a batch type vertical sand mill to prepare a magnetic liquid. As dispersion beads, zirconia beads having a bead diameter of 0.5 mm were used.

Regarding the abrasive solution, the above-mentioned components of each of the abrasive solution A and the abrasive solution B were dispersed for 24 hours using a batch type ultrasonic device (20 kHz, 300 W) to obtain the abrasive solution A and the abrasive solution B.

The magnetic liquid, the abrasive solution A, and the abrasive solution B were mixed with the above-mentioned silica sol and other components, and then subjected to a dispersion treatment for 30 minutes using a batch type ultrasonic device (20 kHz, 300 W). Thereafter, filtration was performed using a filter having a pore diameter of 0.5 μm to prepare a magnetic layer forming composition.

For the non-magnetic layer forming composition, the above-mentioned components were dispersed for 24 hours using a batch type vertical sand mill. As dispersion beads, zirconia beads having a bead diameter of 0.1 mm were used. The obtained dispersion liquid was filtered using a filter having a pore diameter of 0.5 μm to prepare a non-magnetic layer forming composition.

Regarding the back coating layer forming composition, the above-mentioned components were kneaded using a continuous kneader and then dispersed using a sand mill. 40.0 parts of polyisocyanate (CORONATE L manufactured by Nippon Polyurethane Industry Co., Ltd.) and 1000.0 parts of methyl ethyl ketone were added to the obtained dispersion liquid, and then the mixture was filtered using a filter having a pore diameter of 1 μm to prepare a back coating layer forming composition.

The non-magnetic layer forming composition prepared above was applied onto a surface of the support having a thickness of 4.1 μm and having the type shown in Table 1 and was dried so that the thickness after drying was 0.7 μm, and thus a non-magnetic layer was formed.

Next, the magnetic layer forming composition prepared above was applied onto the non-magnetic layer so that the thickness after drying is 0.1 μm, and thus a coating layer was formed.

After that, while this coating layer of the magnetic layer forming composition is in a wet state, a vertical alignment treatment was performed by applying a magnetic field of a magnetic field intensity of 0.3 T in a direction perpendicular to a surface of the coating layer, and then the surface of the coating layer was dried. Thereby, a magnetic layer was formed.

After that, the back coating layer forming composition prepared above was applied onto a surface of the support opposite to the surface on which the non-magnetic layer and the magnetic layer are formed and was dried so that the thickness after drying was 0.3 μm, and thus, a back coating layer was formed.

After that, a surface smoothing treatment (calendering treatment) was performed using a calender roll formed of only metal rolls at a speed of 100 m/min, a linear pressure of 300 kg/cm, and a calender temperature of 90° C. (surface temperature of calender roll). In this way, a long magnetic tape original roll was obtained.

After that, a heat treatment was performed for 36 hours in an environment of an atmosphere temperature of 70° C., and then a long magnetic tape original roll was slit to have ½ inches width to obtain a magnetic tape. A servo signal was recorded on the magnetic layer of the obtained magnetic tape by a commercially available servo writer to obtain a magnetic tape having a servo pattern (timing-based servo pattern) arranged according to a linear tape-open (LTO) Ultrium format.

The magnetic tape (length of 970 m) after forming the servo pattern was wound around a cartridge reel of the magnetic tape cartridge (LTO Ultrium7 data cartridge) for a final product length (960 m), the remaining 10 m was cut off, and a leader tape according to item 9 of Standard European Computer Manufacturers Association (ECMA)-319 (June 2001) Section 3 was joined to an end of the cut side by a commercially available splicing tape.

Therefore, the magnetic tape cartridge of the Example 1 of the single reel type in which the magnetic tape having a length of 960 m is wound on the cartridge reel is manufactured.

It could be confirmed by the following method that the back coating layer of the magnetic tape includes a compound formed of polyethyleneimine and stearic acid and including the ammonium salt structure of the alkyl ester anion represented by Formula 1.

A sample was cut out from the magnetic tape, and X-ray photoelectron spectroscopy analysis is performed on the back coating layer surface (measurement region: 300 μm×700 μm) using an ESCA device. Specifically, the wide scanning measurement was performed by the ESCA device under the following measurement conditions. In measurement results, peaks were confirmed at a binding energy position of an ester anion and a binding energy position of an ammonium cation.

Device: AXIS-ULTRA manufactured by Shimadzu Corporation
Excited X-ray source: monochromatic Al-Kα ray
Scanning range: 0 to 1200 eV
Pass energy: 160 eV
Energy resolution: 1 eV/step
Take-in time: 100 ms/step
Accumulation number: 5

In addition, a sample piece having a length of 3 cm was cut out from the magnetic tape, and the attenuated total reflection-fourier transform-infrared spectrometer (ATR-FT-TR) measurement (reflection method) was performed on the back coating layer surface. In measurement results, an absorption was confirmed at the wave number (1540 $cm^{-1}$ or 1430 $cm^{-1}$) corresponding to an absorption of $COO^-$ and the wave number (2400 $cm^{-1}$) corresponding to an absorption of an ammonium cation.

The above steps were repeated to manufacture three magnetic tape cartridges, one magnetic tape cartridge was used for the following (5) to (7), another magnetic tape cartridge was used for the following (8) and (9), and the other magnetic tape cartridge was used for evaluation of the running stability described below.

(5) Recording of Data on Magnetic Tape Before Storage and Reproduction of Recorded Data Recording and reproduction before storage were performed using a magnetic tape apparatus having the configuration shown in FIG. 1. The recording and reproducing head mounted on the recording and reproducing head unit had 32 or more channels of a reproducing element (reproducing element width: 0.8 μm) and a recording element, and had servo signal reading and reproducing elements on both sides thereof.

The magnetic tape cartridge was placed in an environment of an atmosphere temperature of 23° C. and a relative humidity of 50% for 5 days in order to be adapted to the environment for recording and reproduction. Then, in the same environment, recording and reproduction were performed as follows.

The magnetic tape cartridge was set in the magnetic tape apparatus and the magnetic tape was loaded. Next, pseudo random data having a specific data pattern was recorded on the magnetic tape by the recording and reproducing head unit while performing servo tracking. In this case, the tension applied in the tape longitudinal direction was set to a certain value of 0.50 N. Simultaneously with the recording of the data, the value of the servo band interval of the tape total length was measured at every 1 m of the longitudinal position and recorded in the cartridge memory.

Then, the data recorded on the magnetic tape was reproduced by the recording and reproducing head unit while performing servo tracking. In this case, the value of the servo band interval was measured simultaneously with the reproduction, and the tension applied in the tape longitudinal direction was changed such that an absolute value of a difference from the servo band interval during recording at the same longitudinal position approaches 0 based on information recorded in the cartridge memory. During reproduction, measurement of the servo band interval and tension control based on the measurement were continuously performed in real time. During such reproduction, the tension applied in the longitudinal direction of the magnetic tape was changed in a range of 0.50 N to 0.85 N by the control device of the magnetic tape apparatus. Therefore, the maximum value of the tension applied in the longitudinal direction of the magnetic tape during the reproduction is 0.85 N.

At an end of the reproduction, the entire length of the magnetic tape was wound around the cartridge reel of the magnetic tape cartridge.

(6) Winding (Rewinding) Around Cartridge Reel and Storage

Subsequently, in the above-mentioned environment, the magnetic tape was run in the magnetic tape apparatus, and the entire length of the magnetic tape was wound around the winding reel of the magnetic tape apparatus. The tension applied in the longitudinal direction of the magnetic tape during this winding was set to a certain value of 0.50 N.

After that, a tension was applied in the longitudinal direction of the magnetic tape at a certain value shown in Table 1 to wind (also referred to as "rewind") the entire length of the magnetic tape around the cartridge reel.

After the rewinding, the magnetic tape cartridge accommodating the magnetic tape was stored for 24 hours in an environment of an atmosphere temperature of 60° C. and a relative humidity of 20%. The present inventor supposes that this storage can correspond to long-term storage at an atmosphere temperature of 32° C. and a relative humidity of 55% for about 10 years.

(7) Evaluation of Recording and Recording Quality after Storage

The magnetic tape cartridge was placed in an environment of an atmosphere temperature of 23° C. and a relative humidity of 50% for 5 days in order to be adapted to the environment for reproduction after the storage. After that, in the same environment, the reproduction was performed in the same manner as the reproduction before the storage in (5) above. That is, the reproduction was performed by changing the tension applied in the longitudinal direction of the magnetic tape as described above.

The number of channels in the above reproduction was 32, and, in the reproduction after storage, in a case where the data of all 32 channels were correctly read, the recording and reproducing quality was evaluated as "3", in a case where the data of 31-channel to 28-channel were correctly read, the recording and reproducing quality was evaluated as "2", and in other cases, the recording and reproducing quality was evaluated as "1".

(8) The Number of Recesses (Per Area of 40 μm×40 μm) Existing on Surface of Magnetic Layer and Having Equivalent Circle Diameter of 0.10 μm or More and Less than 0.20 μm The following conditions were adopted as the measurement conditions of the AFM, and the number of the recesses (per an area of 40 μm×40 μm) having an equivalent circle diameter in the above range was obtained by the above-described method for the magnetic layer surface of the magnetic tape.

The region of the area of 40 μm×40 μm on the surface of the magnetic layer of the magnetic tape is measured with an AFM (Nanoscope 5 manufactured by BRUKER) in a peak force-tapping mode. SCANASYST-AIR manufactured by BRUKER is used as a probe, a resolution is set to 512 pixels×512 pixels, and a scan speed is set to a speed at which one screen (512 pixels×512 pixels) is measured in 512 seconds.

(9) Total Thickness of Magnetic Tape (Tape Thickness)

Ten tape samples (5 cm in length) were cut out from any part of the magnetic tape, and these tape samples were stacked to measure the thickness. The thickness was measured using a digital thickness gauge of Millimar 1240 compact amplifier and Millimar 1301 induction probe manufactured by MARH Inc. A value (thickness per tape sample) obtained by dividing the measured thickness by 1/10 was defined as the tape thickness. The tape thickness of the magnetic tape was 5.2 μm. The tape thickness was obtained in the same manner for Examples and Comparative Examples described below, and the tape thickness was 5.2 μm.

Examples 2 to 30 and Comparative Examples 1 to 24

A magnetic tape cartridge was manufactured and various evaluations were performed in the same manner as in Example 1 except that the items in Table 1 were changed as shown in Table 1.

In Examples and Comparative Examples in which "Present" is described in the column of "Tension change during running" in Table 1, reproduction before storage was performed by changing the tension applied in the longitudinal direction of the magnetic tape in a range of the minimum value to the maximum value as in Example 1.

In Example in which "Absent" is described in the column of "Tension change during running" in Table 1, a tension was applied in the longitudinal direction of the magnetic tape at a certain value of 0.50 N to perform reproduction before storage.

In Examples and Comparative Examples in which the value of the tension is described in the column of "Rewinding tension" in Table 1, the tension applied in the longitudinal direction of the magnetic tape during the winding (rewinding) around the cartridge reel in (6) above was set as the value shown in Table 1.

In each of Examples and Comparative Examples, reproduction after storage was performed in the same manner as the reproduction before storage. That is, during reproduction after storage, the tension applied in the longitudinal direction of the magnetic tape and the presence or absence of the tension change were the same as in the reproduction before the storage.

In Comparative Examples in which "No rewinding" is described in the column of "Rewinding tension" in Table 1, after the reproduction according to (5) above, the magnetic tape cartridge accommodating the magnetic tape was stored in an environment of an atmosphere temperature of 60° C. and a relative humidity of 20% for 24 hours without rewinding.

[Evaluation of Running Stability During Winding Around Cartridge Reel at Tension of 0.30 N or Less]

For each of the magnetic tape cartridges of Examples and Comparative Examples, the running stability in a case of winding around the cartridge reel at a tension of 0.30 N or less was evaluated using the magnetic tape apparatus having the configuration shown in FIG. 1.

The magnetic tape cartridge was placed in an environment of an atmosphere temperature of 23° C. and a relative humidity of 50% for 5 days in order to be adapted to the environment for evaluation. Then, in the same environment, evaluation was performed as follows.

The magnetic tape cartridge was set in the magnetic tape apparatus and the magnetic tape was loaded. Next, the entire length of the magnetic tape was wound around the winding reel of the magnetic tape apparatus while performing the same tension adjustment as in the reproduction of Example 1. After that, a tension was applied at a certain value of 0.30 N in the longitudinal direction of the magnetic tape in the same manner as in the rewinding of Example 1, and the entire length of the magnetic tape was wound (rewound) around the cartridge reel. During this rewinding, an edge positional fluctuation amount (unit: μm) of edges on both sides of the magnetic tape in the tape width direction was measured by a measuring device (device body: MTI-2000 Fotonic Sensor (manufactured by MTI Instruments Inc.), detection lower limit of positional fluctuation amount of probe: 10 μm) installed outside the magnetic tape cartridge. A case where an edge positional fluctuation of 300 μm or more occurs in at least one edge was evaluated as "B", and a case where such an edge positional fluctuation does not occur was evaluated as "A". In a case of the evaluation result "B", the present inventor considers that edge damage may occur in the magnetic tape cartridge after rewinding.

The above results are shown in Table 1 (Table 1-1 and Table 1-2).

TABLE 1

| | Magnetic layer forming composition | | | Back coating layer forming composition | | Magnetic layer The number of recesses having equivalent circle diameter of 0.10 μm or more and less than 0.20 μm (per area of 40 μm × 40 μm) |
|---|---|---|---|---|---|---|
| | Ferromagnetic powder type | Dispersing agent amount | Non-magnetic support | Polyethyleneimine amount | Stearic acid amount | |
| Example 1 | BaFe | 10.0 parts | PET | 0.1 parts | 0.2 parts | 2000 |
| Example 2 | BaFe | 15.0 parts | PET | 0.1 parts | 0.2 parts | 2000 |
| Example 3 | BaFe | 20.0 parts | PET | 0.1 parts | 0.1 parts | 2000 |
| Example 4 | BaFe | 10.0 parts | PET | 0.2 parts | 0.5 parts | 1000 |
| Example 5 | BaFe | 15.0 parts | PET | 0.2 parts | 0.4 parts | 1000 |
| Example 6 | BaFe | 5.0 parts | PET | 0.3 parts | 0.5 parts | 1000 |
| Example 7 | BaFe | 10.0 parts | PET | 0.8 parts | 1.6 parts | 300 |
| Example 8 | BaFe | 15.0 parts | PET | 0.7 parts | 1.5 parts | 300 |
| Example 9 | BaFe | 5.0 parts | PET | 0.8 parts | 1.6 parts | 300 |
| Example 10 | BaFe | 10.0 parts | PET | 2.3 parts | 4.7 parts | 100 |
| Example 11 | BaFe | 15.0 parts | PET | 2.3 parts | 4.6 parts | 100 |
| Example 12 | BaFe | 5.0 parts | PET | 2.4 parts | 4.7 parts | 100 |
| Example 13 | BaFe | 10.0 parts | PET | 0.1 parts | 0.2 parts | 2000 |
| Example 14 | BaFe | 15.0 parts | PET | 0.1 parts | 0.2 parts | 2000 |
| Example 15 | BaFe | 20.0 parts | PET | 0.1 parts | 0.1 parts | 2000 |
| Example 16 | BaFe | 10.0 parts | PET | 0.2 parts | 0.5 parts | 1000 |
| Example 17 | BaFe | 15.0 parts | PET | 0.2 parts | 0.4 parts | 1000 |
| Example 18 | BaFe | 5.0 parts | PET | 0.3 parts | 0.5 parts | 1000 |
| Example 19 | BaFe | 10.0 parts | PET | 0.8 parts | 1.6 parts | 300 |
| Example 20 | BaFe | 15.0 parts | PET | 0.7 parts | 1.5 parts | 300 |
| Example 21 | BaFe | 5.0 parts | PET | 0.8 parts | 1.6 parts | 300 |
| Example 22 | BaFe | 10.0 parts | PET | 2.3 parts | 4.7 parts | 100 |
| Example 23 | BaFe | 15.0 parts | PET | 2.3 parts | 4.6 parts | 100 |
| Example 24 | BaFe | 5.0 parts | PET | 2.4 parts | 4.7 parts | 100 |
| Example 25 | BaFe | 10.0 parts | PET | 0.8 parts | 1.6 parts | 300 |
| Example 26 | BaFe | 10.0 parts | PEN | 0.8 parts | 1.6 parts | 300 |
| Example 27 | SrFe1 | 10.0 parts | PET | 0.8 parts | 1.6 parts | 300 |
| Example 28 | SrFe2 | 10.0 parts | PET | 0.8 parts | 1.6 parts | 300 |
| Example 29 | ε-Iron oxide | 10.0 parts | PET | 0.8 parts | 1.6 parts | 300 |
| Example 30 | BaFe | 10.0 parts | PET | 0.1 parts | 0.2 parts | 2000 |
| Comparative Example 1 | BaFe | 0.0 parts | PET | 0.0 parts | 0.0 parts | 5000 |
| Comparative Example 2 | BaFe | 0.0 parts | PET | 0.2 parts | 0.4 parts | 4800 |
| Comparative Example 3 | BaFe | 0.0 parts | PET | 1.7 parts | 3.3 parts | 4000 |
| Comparative Example 4 | BaFe | 0.0 parts | PET | 3.3 parts | 6.7 parts | 3800 |
| Comparative Example 5 | BaFe | 10.0 parts | PET | 0.1 parts | 0.2 parts | 3000 |
| Comparative Example 6 | BaFe | 15.0 parts | PET | 0.1 parts | 0.2 parts | 3000 |
| Comparative Example 7 | BaFe | 30.0 parts | PET | 4.5 parts | 9.1 parts | 60 |
| Comparative Example 8 | BaFa | 10.0 parts | PET | 4.7 parts | 9.3 parts | 50 |
| Comparative Example 9 | BaFe | 0.0 parts | PEN | 0.0 parts | 0.0 parts | 5000 |
| Comparative Example 10 | BaFe | 0.0 parts | PEN | 0.2 parts | 0.4 parts | 4800 |
| Comparative Example 11 | BaFe | 0.0 parts | PEN | 1.7 parts | 3.3 parts | 4000 |
| Comparative Example 12 | BaFe | 0.0 parts | PEN | 3.3 parts | 6.7 parts | 3800 |
| Comparative Example 13 | BaFe | 10.0 parts | PEN | 0.1 parts | 0.2 parts | 3000 |

TABLE 1-continued

| | | | | | | | |
|---|---|---|---|---|---|---|---|
| Comparative Example 14 | BaFe | 15.0 parts | PEN | 0.1 parts | 0.2 parts | 3000 | |
| Comparative Example 15 | BaFe | 30.0 parts | PEN | 4.5 parts | 9.1 parts | 60 | |
| Comparative Example 16 | BaFe | 10.0 parts | PEN | 4.7 parts | 9.3 parts | 50 | |
| Comparative Example 17 | BaFe | 15.0 parts | PET | 0.1 parts | 0.2 parts | 3000 | |
| Comparative Example 18 | BaFe | 15.0 parts | PET | 0.1 parts | 0.2 parts | 3000 | |
| Comparative Example 19 | BaFe | 15.0 parts | PET | 0.1 parts | 0.2 parts | 3000 | |
| Comparative Example 20 | BaFe | 15.0 parts | PEN | 0.1 parts | 0.2 parts | 3000 | |
| Comparative Example 21 | BaFe | 15.0 parts | PEN | 0.1 parts | 0.2 parts | 3000 | |
| Comparative Example 22 | BaFe | 15.0 parts | PEN | 0.1 parts | 0.2 parts | 3000 | |
| Comparative Example 23 | BaFe | 5.0 parts | PET | 0.8 parts | 1.6 parts | 300 | |
| Comparative Example 24 | BaFe | 10.0 parts | PET | 2.3 parts | 4.7 parts | 100 | |

| | Tension change during running | Rewinding tension | Recording and recording quality after storage | Running stability in case of winding around cartridge reel at tension of 0.30N or less |
|---|---|---|---|---|
| Example 1 | Present | 0.30N | 3 | A |
| Example 2 | Present | 0.30N | 3 | A |
| Example 3 | Present | 0.30N | 3 | A |
| Example 4 | Present | 0.30N | 3 | A |
| Example 5 | Present | 0.30N | 3 | A |
| Example 6 | Present | 0.30N | 3 | A |
| Example 7 | Present | 0.30N | 3 | A |
| Example 8 | Present | 0.30N | 3 | A |
| Example 9 | Present | 0.30N | 3 | A |
| Example 10 | Present | 0.30N | 3 | A |
| Example 11 | Present | 0.30N | 3 | A |
| Example 12 | Present | 0.30N | 3 | A |
| Example 13 | Present | 0.20N | 3 | A |
| Example 14 | Present | 0.20N | 3 | A |
| Example 15 | Present | 0.20N | 3 | A |
| Example 16 | Present | 0.20N | 3 | A |
| Example 17 | Present | 0.20N | 3 | A |
| Example 18 | Present | 0.20N | 3 | A |
| Example 19 | Present | 0.20N | 3 | A |
| Example 20 | Present | 0.20N | 3 | A |
| Example 21 | Present | 0.20N | 3 | A |
| Example 22 | Present | 0.20N | 3 | A |
| Example 23 | Present | 0.20N | 3 | A |
| Example 24 | Present | 0.20N | 3 | A |
| Example 25 | Present | 0.10N | 3 | A |
| Example 26 | Present | 0.30N | 3 | A |
| Example 27 | Present | 0.30N | 3 | A |
| Example 28 | Present | 0.30N | 3 | A |
| Example 29 | Present | 0.30N | 3 | A |
| Example 30 | Absent | 0.30N | 2 | A |
| Comparative Example 1 | Present | No rewinding | 1 | B |
| Comparative Example 2 | Present | No rewinding | 1 | B |
| Comparative Example 3 | Present | No rewinding | 1 | B |
| Comparative Example 4 | Present | No rewinding | 1 | B |
| Comparative Example 5 | Present | No rewinding | 1 | B |
| Comparative Example 6 | Present | No rewinding | 1 | B |
| Comparative Example 7 | Present | No rewinding | 1 | B |
| Comparative Example 8 | Present | No rewinding | 1 | B |
| Comparative Example 9 | Present | No rewinding | 1 | B |
| Comparative Example 10 | Present | No rewinding | 1 | B |

TABLE 1-continued

|  |  |  |  |  |
|---|---|---|---|---|
| Comparative Example 11 | Present | No rewinding | 1 | B |
| Comparative Example 12 | Present | No rewinding | 1 | B |
| Comparative Example 13 | Present | No rewinding | 1 | B |
| Comparative Example 14 | Present | No rewinding | 1 | B |
| Comparative Example 15 | Present | No rewinding | 1 | B |
| Comparative Example 16 | Present | No rewinding | 1 | B |
| Comparative Example 17 | Present | 0.60N | 1 | A |
| Comparative Example 18 | Present | 0.50N | 1 | A |
| Comparative Example 19 | Present | 0.30N | 2 | B |
| Comparative Example 20 | Present | 0.60N | 1 | A |
| Comparative Example 21 | Present | 0.50N | 1 | A |
| Comparative Example 22 | Present | 0.30N | 2 | B |
| Comparative Example 23 | Present | No rewinding | 1 | A |
| Comparative Example 24 | Present | No rewinding | 1 | A |

From the results shown in Table 1, it can be confirmed that, in Examples, the magnetic tape could be stably run in a case of accommodating the magnetic tape in the magnetic tape cartridge, and favorable recording and reproducing quality could be obtained after storage.

A magnetic tape cartridge was manufactured in the same manner as in Example 1 except that the vertical alignment treatment was not performed in the manufacture of the magnetic tape.

A sample piece was cut out from the magnetic tape taken out from the magnetic tape cartridge. For this sample piece, a vertical squareness ratio obtained by the method described above using a TM-TRVSM5050-SMSL type manufactured by Tamakawa Co., Ltd. as a vibrating sample magnetometer was 0.55.

The magnetic tape was also taken out from the magnetic tape cartridge of Example 1, and a vertical squareness ratio was similarly determined for a sample piece cut out from the magnetic tape, which was 0.60.

Each of the magnetic tapes taken out from the above two magnetic tape cartridges was attached to a reel tester having ½ inches, and the electromagnetic conversion characteristics (Signal-to-Noise Ratio (SNR)) were evaluated by the following method. As a result, the magnetic tape taken out from the magnetic tape cartridge of Example 1 had a higher SNR value by 2 dB than the magnetic tape manufactured without the vertical alignment treatment.

In an environment of a temperature of 23° C. and a relative humidity of 50%, a tension of 0.7 N was applied in the longitudinal direction of the magnetic tape, and recording and reproduction were performed for 10 passes. A relative speed between the magnetic tape and the magnetic head was set to 6 m/sec, and recording was performed by using a metal-in-gap (MIG) head (a gap length of 0.15 μm and a track width of 1.0 μm) as a recording head and setting a recording current to an optimal recording current of each magnetic tape. Reproduction was performed by using a giant-magnetoresistive (GMR) head (an element thickness of 15 nm, a shield interval of 0.1 μm, and a reproducing element width of 0.8 μm) as a reproducing head. A signal having a linear recording density of 300 kfci was recorded, and measurement regarding a reproduction signal was performed with a spectrum analyzer manufactured by Shiba-soku Co., Ltd. The unit kfci is a unit of a linear recording density (cannot be converted into an SI unit system). As the signal, a portion where the signal was sufficiently stable after start of the running of the magnetic tape was used.

One aspect of the present invention is useful in various data storage technical fields such as archiving.

What is claimed is:

1. A magnetic tape apparatus comprising:
   a winding reel;
   a magnetic tape; and
   a magnetic tape cartridge having a cartridge reel,
   wherein, in the magnetic tape apparatus,
      the magnetic tape is run between the winding reel and the cartridge reel in a state where a tension is applied in a longitudinal direction of the magnetic tape, and a maximum value of the tension is 0.50 N or more,
      the magnetic tape after being run in a state where the tension is applied is wound around the cartridge reel with a tension of 0.30 N or less applied in the longitudinal direction of the magnetic tape,
      the magnetic tape includes a non-magnetic support, and a magnetic layer containing a ferromagnetic powder, and
      a number of recesses existing on a surface of the magnetic layer and having an equivalent circle diameter of 0.10 μm or more and less than 0.20 μm, is 100 or more and 2000 or less per an area of 40 μm×40 μm.

2. The magnetic tape apparatus according to claim 1, wherein the tension applied in the longitudinal direction of the magnetic tape is changed during the running.

3. The magnetic tape apparatus according to claim 2, wherein a tape thickness of the magnetic tape is 5.2 μm or less.

4. The magnetic tape apparatus according to claim 3, wherein a vertical squareness ratio of the magnetic tape is 0.60 or more.

5. The magnetic tape apparatus according to claim 2, wherein a vertical squareness ratio of the magnetic tape is 0.60 or more.

6. The magnetic tape apparatus according to claim 1, wherein a tape thickness of the magnetic tape is 5.2 μm or less.

7. The magnetic tape apparatus according to claim 6, wherein a vertical squareness ratio of the magnetic tape is 0.60 or more.

8. The magnetic tape apparatus according to claim 1, wherein the magnetic tape further includes a non-magnetic layer containing a non-magnetic powder between the non-magnetic support and the magnetic layer.

9. The magnetic tape apparatus according to claim 1, wherein the magnetic tape further includes a back coating layer containing a non-magnetic powder on a surface side of the non-magnetic support opposite to a surface side having the magnetic layer.

10. The magnetic tape apparatus according to claim 9, wherein the non-magnetic powder of the back coating layer includes carbon black.

11. The magnetic tape apparatus according to claim 1, wherein a vertical squareness ratio of the magnetic tape is 0.60 or more.

12. A magnetic tape, which is used in a magnetic tape apparatus in which the magnetic tape is run between a winding reel and a cartridge reel of a magnetic tape cartridge in a state where a tension is applied in a longitudinal direction of the magnetic tape, a maximum value of the tension is 0.50 N or more, and the magnetic tape after being run in a state where the tension is applied is wound around the cartridge reel with a tension of 0.30 N or less applied in the longitudinal direction of the magnetic tape, the magnetic tape comprising:
a non-magnetic support; and
a magnetic layer containing a ferromagnetic powder,
wherein the number of recesses existing on a surface of the magnetic layer and having an equivalent circle diameter of 0.10 μm or more and less than 0.20 μm, is 100 or more and 2000 or less per an area of 40 μm×40 μm.

13. The magnetic tape according to claim 12, wherein the tension applied in the longitudinal direction of the magnetic tape is changed during the running.

14. The magnetic tape according to claim 12, wherein a tape thickness is 5.2 μm or less.

15. The magnetic tape according to claim 12, further comprising:
a non-magnetic layer containing a non-magnetic powder between the non-magnetic support and the magnetic layer.

16. The magnetic tape according to claim 12, further comprising:
a back coating layer containing a non-magnetic powder on a surface side of the non-magnetic support opposite to a surface side having the magnetic layer.

17. The magnetic tape according to claim 16, wherein the non-magnetic powder of the back coating layer includes carbon black.

18. The magnetic tape according to claim 12, wherein a vertical squareness ratio is 0.60 or more.

19. A magnetic tape cartridge in which the magnetic tape according to claim 12 is accommodated by being wound around a cartridge reel.

* * * * *